(12) United States Patent
Liu

(10) Patent No.: US 12,192,765 B2
(45) Date of Patent: Jan. 7, 2025

(54) MANAGEMENT OF USER EQUIPMENT SECURITY CAPABILITIES IN COMMUNICATION SYSTEM

(71) Applicant: Nokia Technologies Oy, Espoo (FI)

(72) Inventor: Jennifer Liu, Plano, TX (US)

(73) Assignee: Nokia Technologies Oy, Espoo (FI)

( * ) Notice: Subject to any disclaimer, the term of this patent is extended or adjusted under 35 U.S.C. 154(b) by 264 days.

(21) Appl. No.: 17/430,690

(22) PCT Filed: Jan. 29, 2020

(86) PCT No.: PCT/FI2020/050046
§ 371 (c)(1),
(2) Date: Aug. 12, 2021

(87) PCT Pub. No.: WO2020/165492
PCT Pub. Date: Aug. 20, 2020

(65) Prior Publication Data
US 2022/0201488 A1    Jun. 23, 2022

Related U.S. Application Data

(60) Provisional application No. 62/806,370, filed on Feb. 15, 2019.

(51) Int. Cl.
*H04W 12/106* (2021.01)
*H04L 9/40* (2022.01)
(Continued)

(52) U.S. Cl.
CPC ......... *H04W 12/106* (2021.01); *H04L 63/205* (2013.01); *H04L 67/303* (2013.01);
(Continued)

(58) Field of Classification Search
CPC ... H04W 12/106; H04W 12/03; H04W 12/37; H04W 36/0038; H04W 36/32; H04L 63/205; H04L 67/303; H04L 69/28
See application file for complete search history.

(56) References Cited

U.S. PATENT DOCUMENTS

| | | | | |
|---|---|---|---|---|
| 2008/0304434 A1* | 12/2008 | Giaretta | ............... | H04W 60/005 370/313 |
| 2015/0181462 A1* | 6/2015 | Iwai | ................... | H04W 28/0289 370/229 |

(Continued)

FOREIGN PATENT DOCUMENTS

| | | |
|---|---|---|
| CN | 1571540 A | 1/2005 |
| CN | 101686233 A | 3/2010 |

(Continued)

OTHER PUBLICATIONS

Office action received for corresponding Vietnam Patent Application No. 1-2021-05285, dated Oct. 15, 2021, 1 page of office action and 1 page of translation available.

(Continued)

*Primary Examiner* — Cheng-Feng Huang
(74) *Attorney, Agent, or Firm* — Ryan, Mason & Lewis, LLP

(57) ABSTRACT

Techniques for security management in communication systems are provided. For example, a method includes receiving, from user equipment, a request indicating one or more security capabilities of the user equipment. The method also includes determining whether the indicated one or more security capabilities meet one or more designated criteria of a communication network, and rejecting the request by the user equipment responsive to determining that the indicated one or more security capabilities do not meet the one or more designated criteria of the communication network. For example, the request is rejected when it is determined that (Continued)

the user equipment does not support any encryption and/or integrity algorithms, or fails to support mandatory encryption and/or integrity algorithms. This serves to prevent malicious user equipment from gaining access to the communication network.

20 Claims, 28 Drawing Sheets

(51) Int. Cl.
    *H04L 67/303*    (2022.01)
    *H04W 12/03*     (2021.01)
    *H04W 12/37*     (2021.01)
    *H04W 36/00*     (2009.01)
    *H04L 69/28*     (2022.01)

(52) U.S. Cl.
    CPC ........... *H04W 12/03* (2021.01); *H04W 12/37* (2021.01); *H04W 36/0038* (2013.01); *H04L 69/28* (2013.01)

(56) References Cited

U.S. PATENT DOCUMENTS

| | | | |
|---|---|---|---|
| 2016/0183156 A1* | 6/2016 | Chin | H04L 61/5007 370/331 |
| 2017/0367031 A1 | 12/2017 | Kuge et al. | |
| 2018/0376444 A1* | 12/2018 | Kim | H04W 68/02 |
| 2019/0230585 A1* | 7/2019 | Chun | H04W 80/02 |
| 2019/0349759 A1* | 11/2019 | Rosenberg | H04W 12/02 |
| 2019/0394651 A1* | 12/2019 | Wifvesson | H04W 12/033 |

FOREIGN PATENT DOCUMENTS

| | | |
|---|---|---|
| CN | 102960029 A | 3/2013 |
| WO | 2011/001861 A1 | 1/2011 |
| WO | 2019/030727 A1 | 2/2019 |

OTHER PUBLICATIONS

"Discussion on Handling when the UE Indicated Security Capabilities are Invalid or Unacceptable", 3GPP TSG CT WG1 Meeting #115, C1-191324, Agenda : 15.2.2.1, Nokia, Feb. 25-Mar. 1, 2019, 2 pages.
"Handling when the UE Indicated Security Capabilities are Invalid or Unacceptable", 3GPP TSG CT WG1 Meeting #115, C1-191702, Nokia, Feb. 25-Mar. 1, 2019, 4 pages.
"Handling when the UE Indicated Security Capabilities are Invalid or Unacceptable", 3GPP TSG CT WG1 Meeting #115, C1-191700, Nokia, Feb. 25-Mar. 1, 2019, 3 pages.
"3rd Generation Partnership Project; Technical Specification Group Core Network and Terminals; Non-Access-Stratum (NAS) protocol for 5G System (5GS); Stage 3 (Release 15)", 3GPP Ts 24.501, V15.2.1, Jan. 2019, pp. 1-455.
"3rd Generation Partnership Project; Technical Specification Group Core Network and Terminals; Non-Access-Stratum (NAS) protocol for Evolved Packet System (EPS); Stage 3 (Release 15)", 3GPP TS 24.301, V15.5.0, Dec. 2018, pp. 1-536.
International Search Report and Written Opinion received for corresponding Patent Cooperation Treaty Application No. PCT/FI2020/050046, dated Apr. 2, 2020, 13 pages.
"Discussion on DoS and Replay Attacks for Rejection Procedure", RAN WG2 Meeting #101, R2-1803266, Agenda : 10.4.1.7.5, Huawei, Feb. 26-Mar. 2, 2018, 6 pages.
Rejection Decision received for corresponding Chinese Patent Application No. 202080013950.1, dated Feb. 28, 2023, 8 pages of Rejection Decision, no page of summary/translation available.
Extended European Search Report received for corresponding European Patent Application No. 20755979.0, dated Sep. 29, 2022, 6 pages.
Office Action received for corresponding Chinese Patent Application No. 202080013950.1, dated Oct. 8, 2022, 9 pages of Office Action, 4 pages of summary and translation available.
Indonesian Patent Application No. P00202106509, Notice of Stage 1 Substantive Examination Result (with English language translation), Oct. 30, 2023, 6 pages.
Vietnam Patent Application No. 2101004689 Office Action (with English language translation), Mar. 7, 2024, 6 pages.
Office action received for corresponding Vietnam Patent Application No. 1-2021-05285, dated Aug. 14, 2023, 2 pages of office action and 1 page of translation available.
European Patent Application No. 20755979.0 Office Action, Mar. 22, 2024, 5 pages.

* cited by examiner

Case 1: 5GS Encryption Algorithm Bitmap All Zeros

506-1: | 0 | 0 | 0 | 0 | 0 | 0 | 1 | 0 |

Case 2: 5GS Integrity Algorithm Bitmap All Zeros

506-2: | 0 | 0 | 0 | 0 | 1 | 0 | 0 | 1 |

Case 3: Mandatory 5GS Encryption Algorithm(s) Not Supported

506-3: | 0 | 0 | 0 | 0 | 1 | 1 | 1 | 1 |

Case 4: Mandatory 5GS Integrity Algorithm(s) Not Supported

Case 1: EPS Encryption Algorithm Bitmap All Zeros

1206-1

| 0 | 1 | 0 | 0 | 0 | 0 | 0 | 0 |
|---|---|---|---|---|---|---|---|
| 1 | 0 | 1 | 1 | 0 | 0 | 0 | 0 |

Case 2: EPS Integrity Algorithm Bitmap All Zeros

1206-2

| 1 | 0 | 1 | 1 | 1 | 0 | 0 | 0 |
|---|---|---|---|---|---|---|---|
| 0 | 1 | 0 | 0 | 0 | 0 | 0 | 0 |

Case 3: Mandatory EPS Encryption Algorithm(s) Not Supported

1206-3

| 1 | 1 | 0 | 1 | 1 | 0 | 0 | 0 |
|---|---|---|---|---|---|---|---|
| 1 | 1 | 1 | 1 | 0 | 0 | 0 | 0 |

Case 4: Mandatory EPS Integrity Algorithm(s) Not Supported

1206-4

| 1 | 1 | 1 | 1 | 1 | 0 | 0 | 0 |
|---|---|---|---|---|---|---|---|
| 1 | 1 | 0 | 1 | 0 | 0 | 0 | 0 |

FIG. 12B

MANAGEMENT OF USER EQUIPMENT SECURITY CAPABILITIES IN COMMUNICATION SYSTEM

FIELD

The field relates generally to communication systems, and more particularly, but not exclusively, to security management within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

Security management is an important consideration in any communication system. For example, security of communications between user equipment initially accessing a communication network or seeking to move from a source communication network to a target communication network are examples of security management in both 4G and 5G networks. However, security of such communications presents several challenges, particularly when malicious actors attempt to gain access to communication networks.

SUMMARY

Illustrative embodiments provide improved techniques for security management in communication systems.

For example, in one illustrative embodiment, a method comprises receiving, from user equipment, a request indicating one or more security capabilities of the user equipment. The method further comprises determining whether the indicated one or more security capabilities meet one or more designated criteria of a communication network, and rejecting the request by the user equipment responsive to determining that the indicated one or more security capabilities do not meet the one or more designated criteria of the communication network.

In another illustrative embodiment, a method comprises sending, to a security management node in a communication network, a request indicating one or more security capabilities of the apparatus. The method also comprises receiving, from the security management node, a rejection notification responsive to the indicated one or more security capabilities not meeting one or more designated criteria of the communication network.

The rejection notification, in some embodiments, comprises (i) a failure cause indication based at least in part on the determination that the indicated one or more security capabilities do not meet the one or more designated criteria of the communication network, and (ii) a back-off timer value. The received request may be an initial access request (e.g., an initial registration request or an initial attach request) or a mobility request (e.g., a mobility registration request or a mobility tracking area update request).

In some embodiments, the indicated one or more security capabilities comprise an indication of one or more encryption algorithms supported by the user equipment, such that the request is rejected when it is determined that the user equipment supports no encryption algorithm or fails to support a mandatory encryption algorithm. Similarly, the indicated one or more security capabilities may comprise an indication of one or more integrity algorithms supported by the user equipment, such that the request is rejected when it is determined that the user equipment supports no integrity algorithm or fails to support a mandatory integrity algorithm. This serves to prevent malicious user equipment from gaining access to the communication network.

In a 5G network, the security management node may be an access and mobility management function (AMF), while in a 4G network, the security management node may be a mobility management entity (MME).

One or more illustrative embodiments are implemented in a roaming scenario involving multiple communication networks (e.g. visited and home public land mobile networks).

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIGS. 5A and 5B illustrate examples of 5G security capability bitmap formatting according to one or more illustrative embodiments.

FIGS. 12A and 12B illustrate examples of 4G security capability bitmap formatting according to one or more illustrative embodiments.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP EPC system (4G) and 3GPP next generation system (5G), the disclosed embodiments can be adapted in a straightforward manner to a variety of other types of communication systems.

In accordance with illustrative embodiments implemented in 4G and 5G communication system environments, one or more 3GPP technical specifications (TS) and technical reports (TR) provide explanation of user equipment and network nodes and/or operations that interact in one or more illustrative embodiments. For example, illustrative embodiments use and/or modify system architectures and methodologies described in 3GPP Technical Specification (TS) 24.501, V15.2.1, entitled "Technical Specification Group Core Network and Terminals; Non-Access-Stratum (NAS) protocol for 5G System (5GS)," and in 3GPP TS 24.301, V15.5.0, entitled "Technical Specification Group Core Network and Terminals; Non-Access-Stratum (NAS) protocol for Evolved Packet System (EPS)," the disclosures of which are incorporated by reference herein in their entireties. Other 3GPP TS/TR documents provide other conventional details that one of ordinary skill in the art will realize. However, while illustrative embodiments are well-suited for implementation associated with the above-mentioned 3GPP standards, alternative embodiments are not necessarily intended to be limited to any particular standards.

Currently in wireless communication systems such as 3GPP 4G or 5G networks, when a user device (user equipment or UE) first attaches to a network, the user device indicates its security capabilities such as supported encryption algorithms and supported integrity algorithms to the network. Upon receiving the device security capabilities, the network then selects the algorithms to be used based at least in part on both the supported security algorithms indicated by the user device and the network supported security algorithms.

Figure 1:
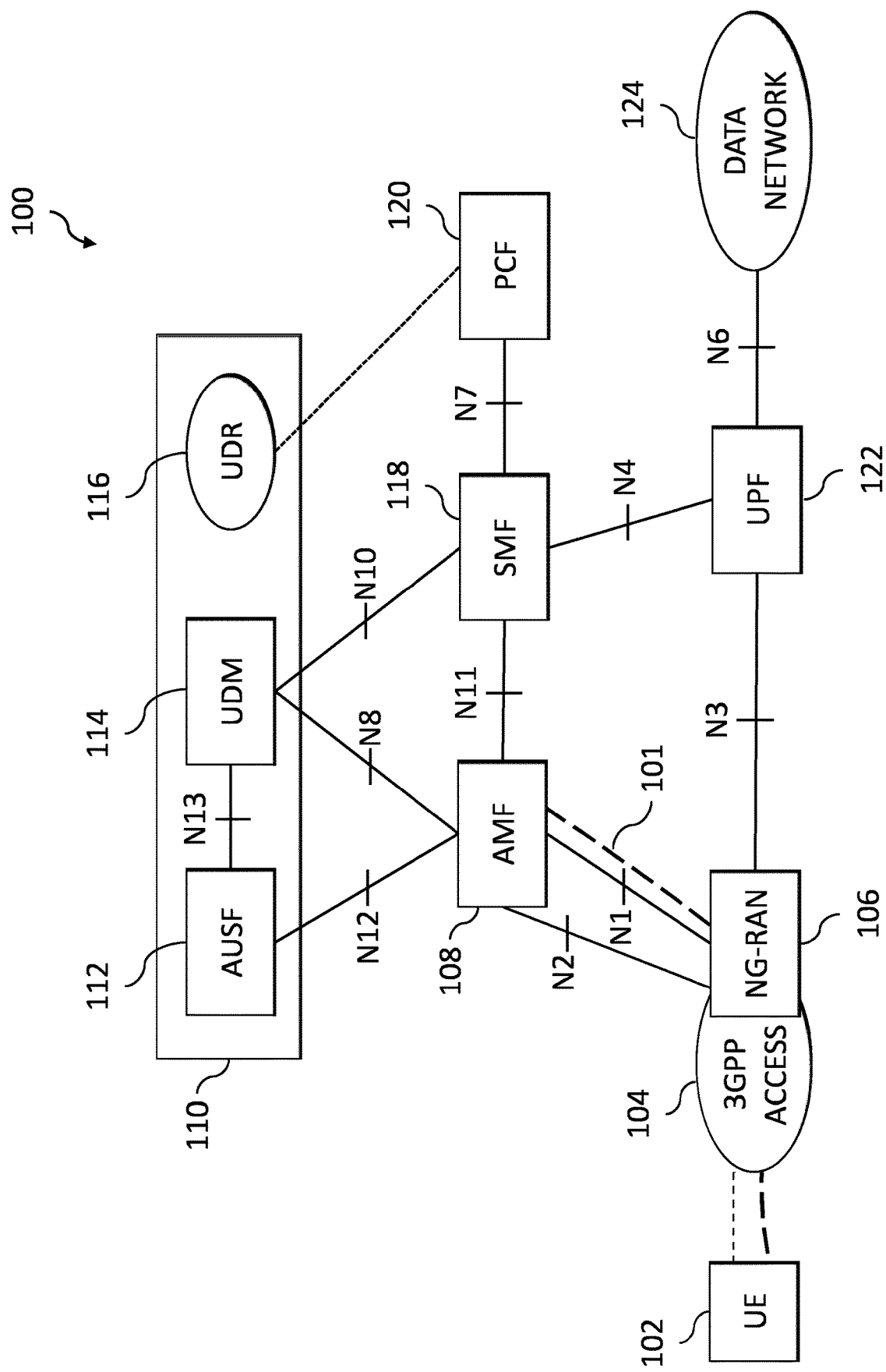
FIG. 1 illustrates a system configuration of a 5G network with which one or more illustrative embodiments are implemented.

FIG. 1 illustrates a system 100 where a UE 102 indicates security capabilities 101 when accessing a 5G core network via 3GPP access. The system 100 includes the UE 102, a 3GPP access network 104, an NG radio access network (NG-RAN) 106, an access management function (AMF) 108, elements 110 that provide the functionality of a 4G home subscriber service (HSS) in the 5G network including an authentication server function (AUSF) 112, user data management (UDM) 114 and user data repository (UDR) 116, a session management function (SMF) 118, a policy control function (PCF) 120, a user plane function (UPF) 122 and a data network (DN) 124. FIG. 1 also illustrates the reference points representing interactions between such elements (e.g., the N12 reference point between the AMF 108 and AUSF 112, the N13 reference point between the AUSF 112 and the UDM 114, etc.). The UE 102 provides an indication of security capabilities 101 to the AMF 108 via the 3GPP access network 104 and NG-RAN 106 as illustrated.

Figure 2:
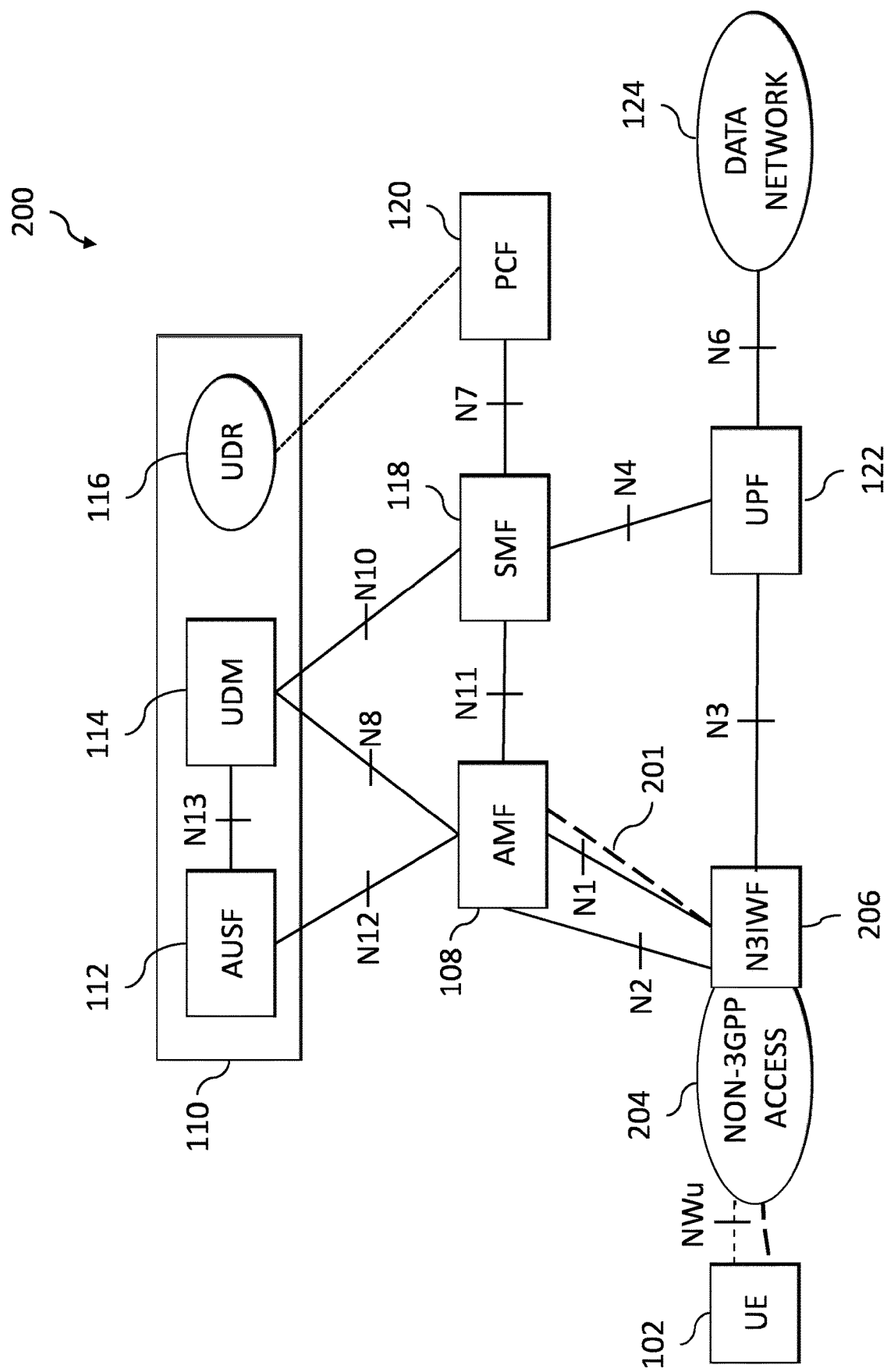
FIG. 2 illustrates another system configuration of a 5G network with which one or more illustrative embodiments are implemented.

FIG. 2 illustrates a system 200 where the UE 102 indicates security capabilities 201 when accessing a 5G core network via non-3GPP access. The system 200 includes many of the same elements as system 100 (e.g., the UE 102, AMF 108, AUSF 112, UDM 114, UDR 116, SMF 118, PCF 120, UPF 122 and DN 124). The UE 102 in the system 200, however, access the 5G core network over a non-3GPP access network 204 and non-3GPP interworking function (N3IWF) 206 via reference point NWu to provide the indication of security capabilities 201.

Figure 3:
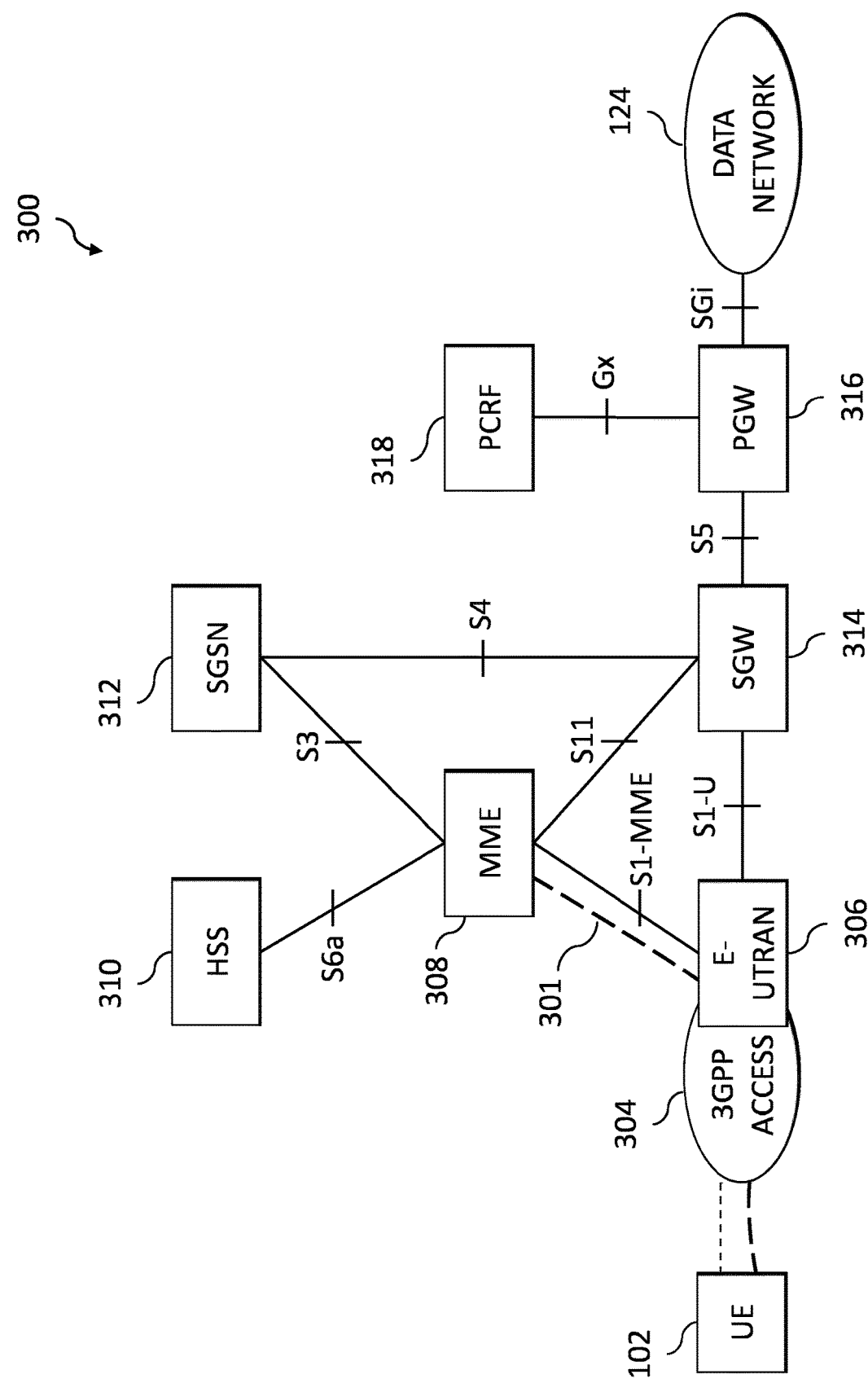
FIG. 3 illustrates a system configuration of a 4G network with which one or more illustrative embodiments are implemented.

FIG. 3 illustrates a system 300 where the UE 102 indicates security capabilities 301 when accessing a 4G core network (e.g., 4G evolved packet core (EPC)) via 3GPP access. The system 300 includes the UE 102, a 3GPP access network 304, an evolved universal terrestrial access network (E-UTRAN) 306, a mobility management element (MME) 308, HSS 310, serving general packet radio service (GPRS) support node (SGSN) 312, serving gateway (SGW) 314, packet data network (PDN) gateway (PGW) 316, policy and charging rules function (PCRF) 318 and DN 124. FIG. 3 also illustrates the reference points representing interactions between such elements (e.g., the S6a reference point between the MME 308 and HSS 310, the S4 reference point between the SGSN 312 and SGW 314, etc.). The UE 102 provides an indication of security capabilities 301 to the MME 308 via the 3GPP access network 304 and E-UTRAN 306 as illustrated.

Besides the normal encryption algorithms and integrity algorithms, there is a need for the UE 102 to indicate support of a NULL encryption algorithm (NEA0) and a NULL integrity algorithm (NIA0). These NULL algorithms (NEA0, NIA0) are used to enable UE that cannot be authenticated by the network due to various reasons to establish emergency sessions. If the AMF 108 in the 5G network (or MME 308 in the 4G network) allows unauthenticated UE in a limited service state to establish an emergency session, then the AMF 108 (or MME 308) can select the NULL encryption algorithm (NEA0) and the NULL integrity algorithm (NIA0) as the integrity and encryption algorithms in order to establish the emergency session.

Before describing further details of the above-mentioned and other methodologies according to illustrative embodiments, illustrative configurations of a UE and a network node will first be described.

Figure 4:
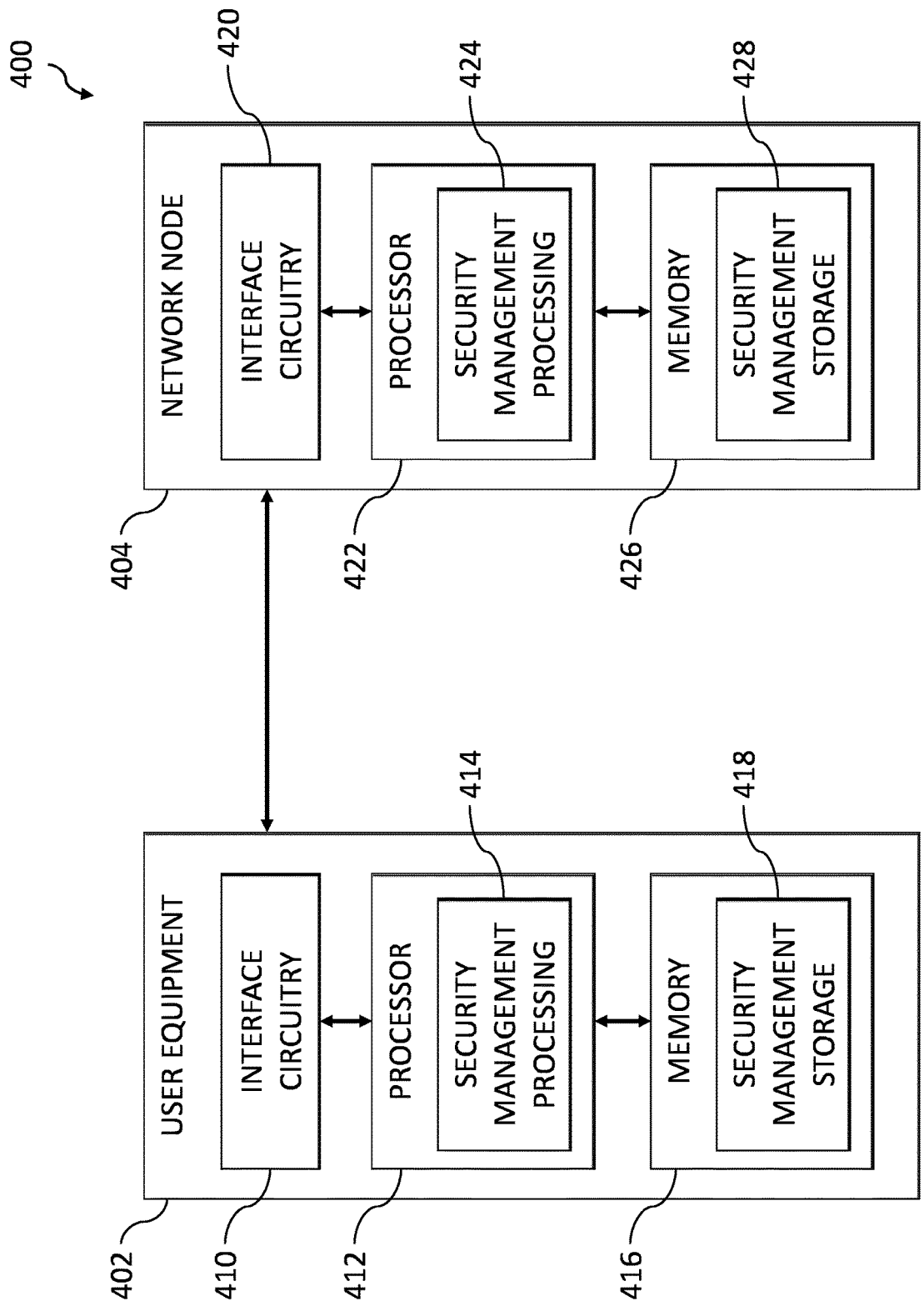
FIG. 4 illustrates user equipment and a network node for providing security management with which one or more illustrative embodiments are implemented.

FIG. 4 is a block diagram of a system 400 including a UE 402 and a network node (e.g., a network element, a network function or another network entity) 404 configured to provide security management functionality in one or more illustrative embodiments. It is to be appreciated that the network node 404 may represent any network element, network function or other network entity that is configured to provide security management functionality as described herein. By way of example, but not limited thereto, network node 404 may be an AMF in a 5G network (e.g., AMF 108) or an MME in a 4G network (e.g., MME 308). Network node 404 is considered an example of what is more generally referred to herein as a "security management node." UE 402, in illustrative embodiments, attaches to 5G network via a gNB (5G) or attaches to 4G network via an eNB (4G).

The UE 402 comprises a processor 412 coupled to a memory 416 and interface circuitry 410. The processor 412 of UE 402 includes a security management processing module 414 that may be implemented at least in part in the form of software executed by the processor 412. The security management processing module 414 performs security management functionality as described in conjunction with subsequent figures and otherwise herein. The memory 416 of UE 402 includes a security management storage module 418 that stores data generated or otherwise used during security management operations.

The network node 404 comprises a processor 422 coupled to a memory 426 and interface circuitry 420. The processor 422 of the network node 404 includes a security management processing module 424 that may be implemented at least in part in the form of software executed by the processor 422. The processing module 424 performs security management functionality as described in conjunction with subsequent figures and otherwise herein. The memory 426 of the network node 404 includes a security management storage module 428 that stores data generated or otherwise used during security management operations.

The processors 412 and 422 of the respective UE 402 and network node 404 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 416 and 426 of the respective UE 402 and network node 404 may be used to store one or more software programs that are executed by the respective processors 412 and 422 to implement at least a portion of the functionality described herein. For example, security management operations and other functionality as described in conjunction with subsequent figures and otherwise herein may be implemented in a straightforward manner using software code executed by processors 412 and 422.

A given one of the memories 416 or 426 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 416 or 426 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 410 and 420 of the respective UE 402 and network node 404 illustratively comprise transceivers or other communication hardware or firmware that allows the associated system elements to communicate with one another in the manner described herein.

It is apparent from FIG. 4 that UE 402 is configured for communication with network node 404 and vice-versa via their respective interface circuitries 410 and 420. This communication involves UE 402 sending data to the network node 404, and the network node 404 sending data to the UE 402. Other network elements may be operatively coupled between, as well as to, UE 402 and network node 404. For example, in illustrative embodiments, UE 402 and network node 404 communicate through an access point such as an eNB in a 4G network or a gNB in a 5G network. The term "data" as used herein is intended to be construed broadly so as to encompass any type of information that may be sent between the UE 402 and the network node 404 of a core network including, but not limited to, requests, notifications, tokens, identifiers, keys, indicators, user data, control data, other messages, etc.

It is to be appreciated that the particular arrangement of components shown in FIG. 4 is an example only, and numerous alternative configurations are used in other embodiments. For example, any UE and/or network node can be configured to incorporate additional or alternative components and to support other communication protocols.

Other system elements may each also be configured to include components such as a processor, memory and network interface. These elements need not be implemented on separate stand-alone processing platforms, but could instead, for example, represent different functional portions of a single common processing platform.

Further detailed descriptions of the above-mentioned and other methodologies according to illustrative embodiments will now be described.

Figure 5A:
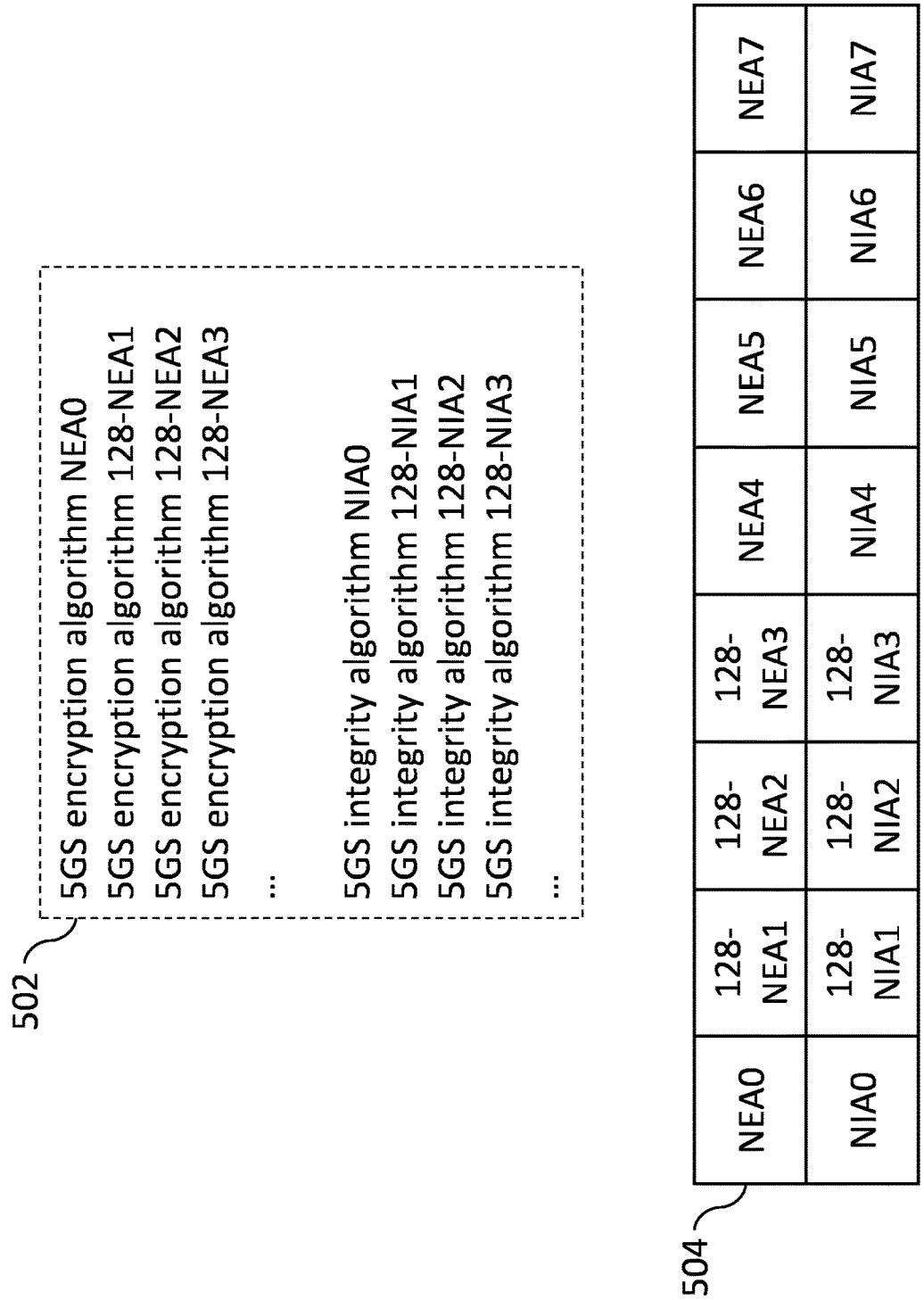

Currently, for 5G networks, the network assumes that user devices will send their supported encryption algorithms and integrity algorithms during UE registration and handover to N1 mode, and that the user devices will format the UE security capabilities bitmap correctly. FIG. 5A shows an example of the UE security capabilities 502 (e.g., a set of 5G system (5GS) encryption and integrity algorithms including the NULL encryption and integrity algorithms NEA0 and NIA0 as well as 5GS encryption and integrity algorithms such as 128-NEA1, 128-NEA2, 128-NEA3, 128-NIA1, 128-NIA2, 128-NIA3, etc.) which are formatted as shown in bitmap 504.

Figure 12A:

A similar assumption is made for 4G networks, where the network assumes that user devices will send their supported encryption algorithms and integrity algorithms during UE attach and handover to S1 mode, and that the user devices will format the UE security capabilities bitmap correctly. FIG. 12A shows an example of the UE security capabilities 1202 (e.g., a set of evolved packet system (EPS) encryption and integrity algorithms including the NULL encryption and integrity algorithms EEA0 and EIA0 as well as EPS encryption and integrity algorithms such as 128-EEA1, 128-EEA2, 128-EEA3, 128-EIA1, 128-EIA2, 128-EIA3, etc.) which are formatted as shown in bitmap 1204.

In a 5G network, the AMF (e.g., AMF 108) selects an encryption algorithm and an integrity algorithm based at least in part on the 5GS encryption and integrity algorithms supported by the UE (e.g., UE 102) and the operator configuration. Similarly, in a 4G network, the MME (e.g., MME 308) selects an encryption algorithm and an integrity algorithm based at least in part on EPC encryption and integrity algorithms supported by the UE (e.g., UE 102) and the operator configuration.

The above processing, however, covers or handles only "normal" cases. For "abnormal" cases, handling has not been defined. This results in various field issues, such as cases of attacks where illegal all-zero security capabilities were provided by malicious UE leading to a wrong selection of integrity and encryption algorithms (e.g., EEA7, EIA7). Further, there could be other unacceptable or unsupported algorithm combinations indicated by a UE (e.g., UE 102) which the network is not able to support. Accordingly, there is a need to define mechanisms for handling such abnormal cases, including to prevent the above-described security attacks from malicious UE.

In addition, for a 5G network, when the UE indicates security capabilities during a mobility scenario, related handling on the network side could be different depending on whether there has been a change between the UE-indicated security capabilities (e.g., provided by the UE to a target AMF as part of a mobility registration request) and the UE security capabilities retrieved from a source AMF. Such network-side handling has not been defined. Similarly, network-side handling needs to be defined for UE security capability indications during mobility events in a 4G network (e.g., as part of handling tracking area update requests from a UE).

Illustrative embodiments provide methods for abnormal case handling, to prevent security attacks from malicious UE and to handle other abnormal cases. Illustrative embodiments enable the communication network to reject the UE's request to access the network if the indicated security capabilities from the UE do not meet one or more designated criteria of the communication network. The designated criteria may include, for example, determining whether one or more encryption and integrity algorithms supported by the UE match one or more encryption algorithms supported by the communication network. In the description below, the security capabilities of the UE not meeting the one or more designated criteria of the communication network is also referred to as the security capabilities of the UE being invalid or unacceptable. In some cases, the security capabilities of the UE are valid but not acceptable (e.g., such as where the communication network does not support encryption and/or integrity algorithms indicated by the UE security capabilities). In other cases, the security capabilities may be invalid and unacceptable (e.g., if the security capabilities of the UE are acceptable to the communication network, the UE security capabilities are assumed to be valid).

Some embodiments provide methods to enable a 5G network to reject a user device (e.g., during registration, including both initial registration and mobility registration) if the UE 5GS security capabilities (e.g., 5GS encryption algorithms or 5GS integrity algorithms) indicated by the user device are not acceptable. This is accomplished by adding logic to enable the 5G network to check the UE's security capability indication during UE registration (e.g., for both initial registration and mobility registration requests) and to reject the registration request if the indicated UE security capability is not acceptable. Further, a new failure or reject cause code can be defined to enable the network to indicate to the UE that the registration or handover failure is due to the device security capability not being acceptable or alternatively a generic failure cause code can be used to signal attach or handover failure to the UE. In addition, corresponding UE behavior and back-off handling mechanisms are specified as described in further detail below. Methods are also provided for handling UE security capability indications and changes during mobility in the 5G network.

In other embodiments, methods are provided to enable a 4G network to reject a user device if the indicated UE EPS security capabilities (e.g., EPS encryption algorithms or EPS integrity algorithms) indicated by the user device are not acceptable. This is accomplished by adding logic to enable the 4G network to check the UE security capability indication during UE attach (e.g., for both initial attach and mobility tracking area update), and to reject the attach request if the indicated UE security capability is not acceptable. Further, a new failure cause code can be defined to enable the network to indicate to the UE that the attach or handover failure is due to the device security capability not being acceptable or alternatively a generic failure cause code can be used to signal attach or handover failure to the UE. In addition, corresponding UE behavior and back-off handling mechanisms are specified as described in further detail below. Methods are also provided for handling UE security capability indications and changes during mobility in the 4G EPC network.

It is to be appreciated that in some 5G embodiments, the AMF (e.g., AMF 108) is configured to provide the functionality that enables the improved security management described herein, while in some 4G embodiments the MME (e.g., MME 308) is configured to do the same. In other embodiments, however, one or more other network nodes or entities are configured to provide part or all of the functionality that enables improved security management as described herein. Further, the UE (e.g., UE 102) is also configured to provide corresponding functionality for enabling the improved security management described herein.

Methods for enabling a 5G network to reject a UE during initial registration if the indicated 5GS security capabilities of the UE (e.g., 5GS encryption algorithms, 5GS integrity algorithms, combinations thereof) are not acceptable will now be described. Logic is added (e.g., in the AMF 108) to enable the 5G network to check the UE security capability indication during UE registration, and to reject the request if the UE security capabilities are not acceptable (e.g., due to the supported 5GS encryption algorithms, 5GS integrity algorithms, or combinations thereof indicated by the UE not being acceptable to the 5G network). When initiating an initial registration request, the UE (e.g., UE 102) indicates support for different 5GS encryption and integrity algorithms in the UE security capability information element (IE) of the registration request message. If the UE-indicated 5GS encryption or integrity algorithms (or combinations thereof) are not valid or acceptable to the 5G network, the 5G network rejects the initial registration request. To do so, the 5G network sets the 5GS mobility management (5GMM) cause value to "UE security capabilities invalid or unacceptable" or a generic failure cause code (e.g. UE security capabilities mismatch or Protocol error, unspecified, etc.) and assigns a back-off timer Txxxx.

The UE-indicated 5GS encryption or integrity algorithms may be unacceptable to the 5G network for various reasons. FIG. 5B shows examples of different cases where the 5GS encryption algorithm bitmap 504 is unacceptable to the 5G network. Bitmap 506-1 illustrates a first case, where the 5GS encryption algorithm bits are all zero (e.g., no 5GS encryption algorithms are supported by the UE). Bitmap 506-2 illustrates a second case, where the 5GS integrity algorithm bits are all zero (e.g., no 5GS integrity algorithms are supported by the UE). Bitmap 506-3 illustrates a third case, where the bit for a mandatory 5GS encryption algorithm is zero (e.g., 128-NEA1 is not supported by the UE). Bitmap 506-4 illustrates a fourth case, where the bit for a mandatory 5GS integrity algorithm is zero (e.g., 128-NIA1 is not supported by the UE). It should be appreciated, however, that various other unsupported cases are possible. For example, in some cases the 5GS encryption algorithm bitmap 504 will indicate that the UE does not support a valid combination of 5GS encryption and integrity algorithms (e.g., the UE supports 128-NEA1 but not 128-NIA1).

Figure 5C:
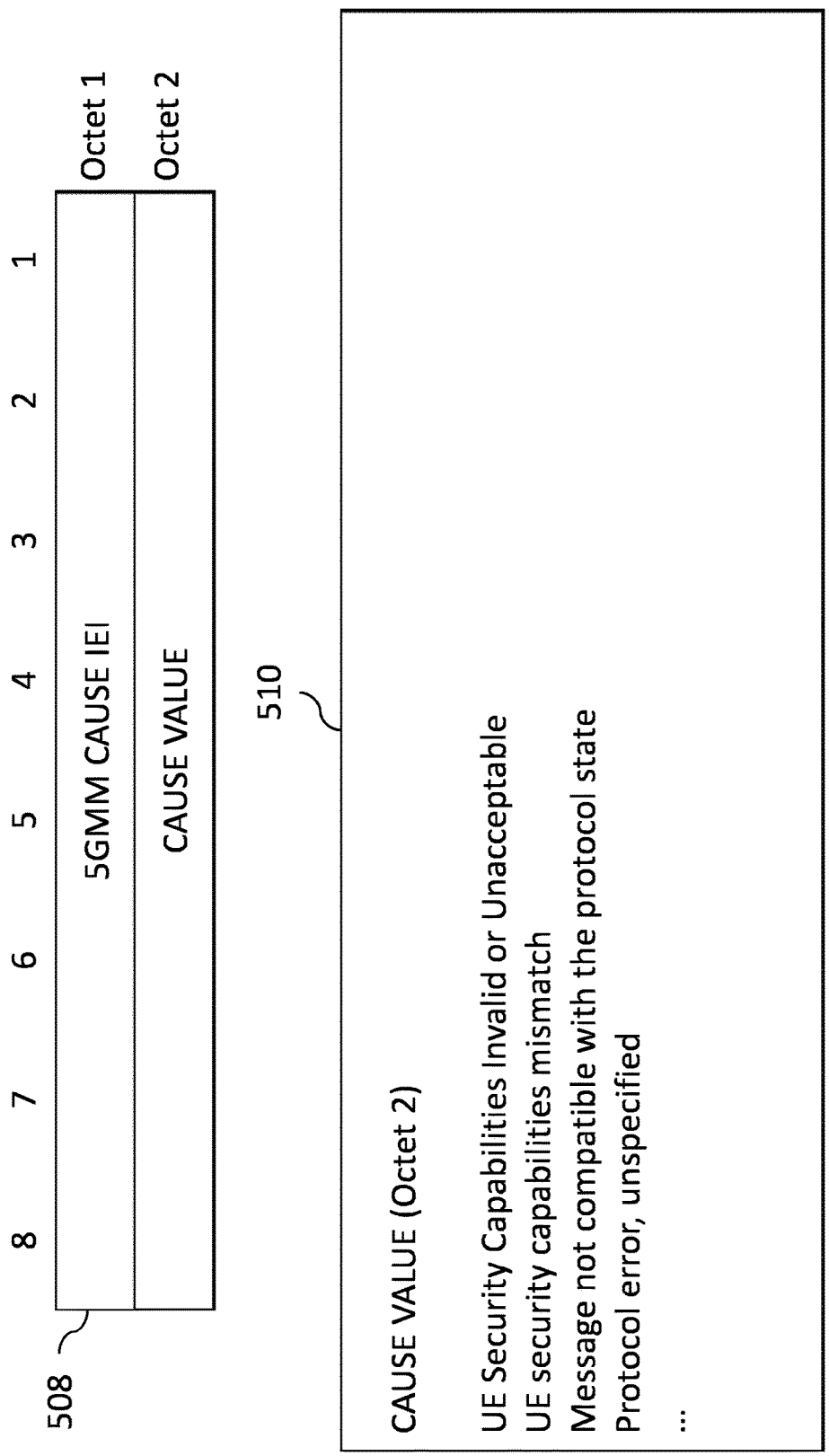
FIG. 5C illustrates of 5GMM cause value formatting according to one or more illustrative embodiments.

A new failure cause code can be defined to enable the network to indicate to the UE that the registration or handover failure is due to the UE-indicated security capability not being acceptable or alternatively a generic failure cause code can be used to signal attach or handover failure to the UE. The 5GMM cause IE indicates the reason why a 5GMM request from a UE is rejected by the network. FIG. 5C shows an example 5GMM cause IE 508. A new failure cause code, can be defined to signal registration or handover failure to the UE due to the UE security capabilities not being acceptable or a generic failure cause code (e.g., UE security capabilities mismatch or Protocol error, unspecified, etc.) to signal attach or handover failure to the UE. The 5GMM cause is sent to the UE if the network detects that the security capabilities indicated by the UE are unacceptable (e.g., one of cases 506-1, 506-2, 506-3 and 506-4 described above, or another case of invalid or unacceptable UE-indicated support for 5GS encryption and integrity algorithms). The 5GMM failure cause is signaled using the 5GMM cause IE 508 as shown in table 510 in FIG. 5C.

UE behavior and back-off handling mechanisms will now be described. If the UE's registration request cannot be accepted by the network due to the UE-indicated security capabilities not being valid or acceptable, the AMF sends a registration reject message to the UE that includes an appropriate 5GMM cause value (e.g., the new 5GMM cause value described above "UE security capabilities invalid or unacceptable" or a generic failure cause code). When the UE receives the registration reject message including the 5GMM cause value indicating that the UE security capabilities are invalid or unacceptable, the UE takes the following actions. The UE will abort the registration procedure (e.g., either an initial registration procedure or a mobility registration procedure) and reset the registration attempt counter. The UE also sets the 5GS update status to "5U2 NOT UPDATED" and enters the state "5GMM-DEREGISTERED.ATTEMPTING-REGISTRATION."

If the registration reject message includes a timer value (e.g., a Txxxx value IE) that indicates that the timer is neither zero nor deactivated, the UE will stop the timer Txxxx if it is running If the registration reject message is integrity protected, the UE starts the timer Txxxx with the value provided in the Txxxx value IE. If the registration reject message is not integrity protected, the UE starts the timer Txxxx with a random value from a default range (e.g., 15 to 30 minutes). The UE stays in the current serving cell, and applies the normal cell reselection process. The initial registration procedure is started, if still needed, with updated UE security capability indication in UE network capability IE when the timer Txxxx expires or is stopped. Optionally, the UE may enter state 5GMM-DEREGISTERED.PLMN-SEARCH in order to perform a public land mobile network (PLMN) selection.

If the UE is operating in single-registration mode, the UE handles the EPS mobility management (EMM) parameters EMM state, EPS update status and attach attempt counter for the case when the EPS attach request procedure is rejected with the EMM cause set to the same value (e.g., "UE security capabilities invalid or unacceptable").

Figure 6A:
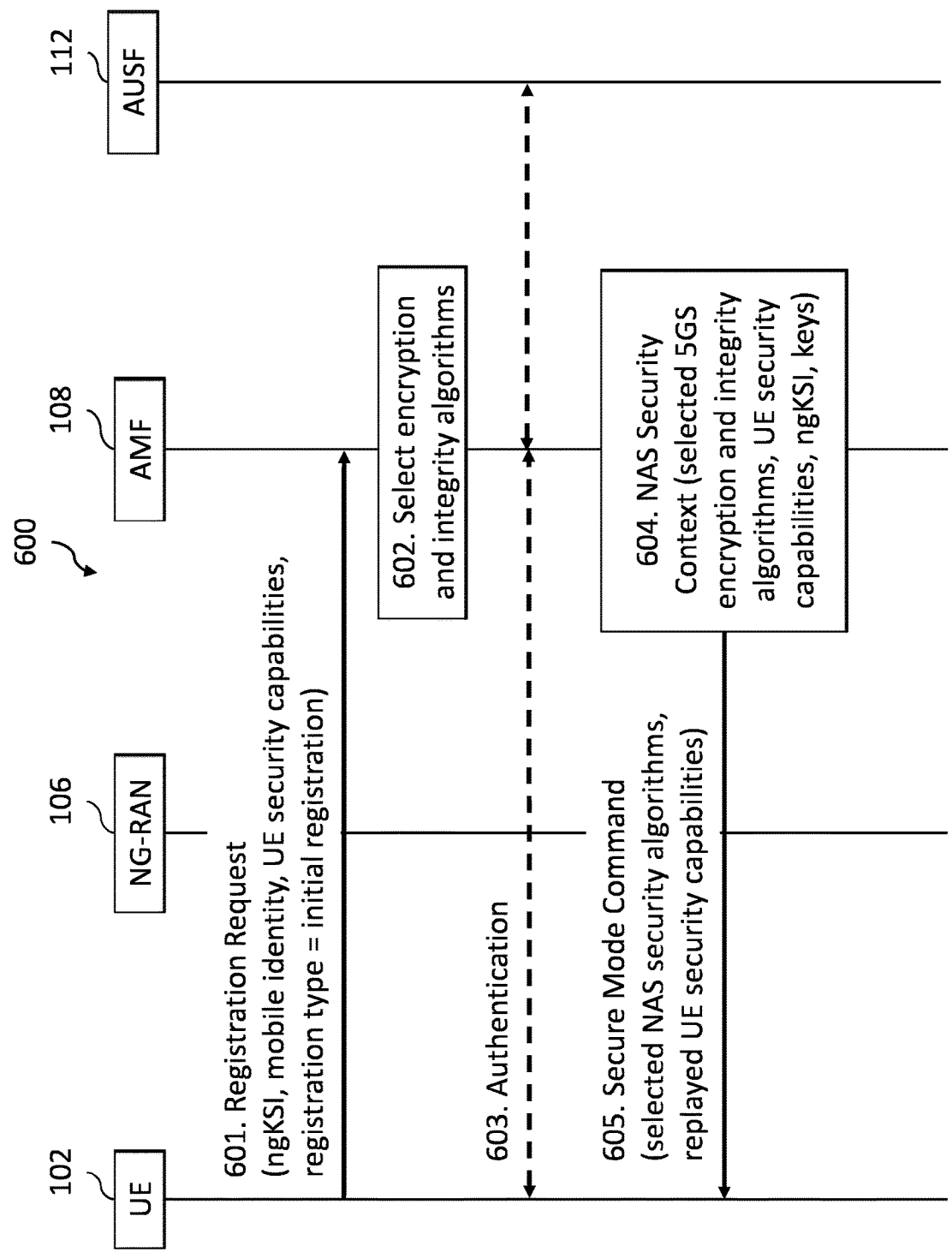
FIGS. 6A and 6B illustrate a message flow for a security management procedure in a 5G network that results in a successful initial registration according to one or more illustrative embodiments.
Figure 6B:
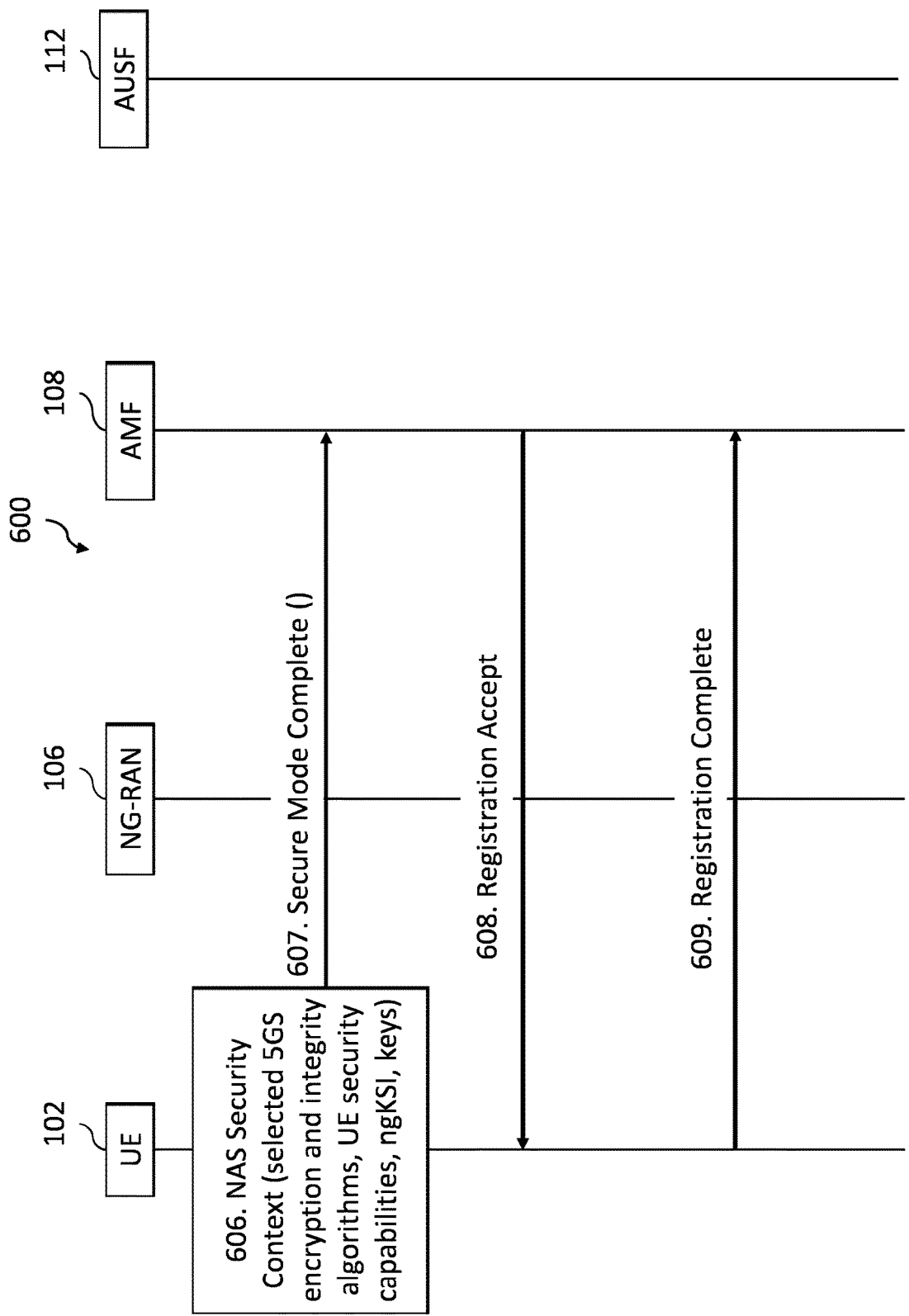

FIGS. 6A and 6B illustrate a message flow 600 for a security management procedure in a 5G network that results in a successful initial registration. In step 601, UE 102 sends a registration request to AMF 108. The registration request includes various parameters, such as a 5G key set identifier (ngKSI), a mobile identity, UE security capabilities, and a registration type. In the message flow 600, the registration type is assumed to comprise an initial registration. In step 602, the AMF 108 selects encryption and integrity algorithms (e.g., among those supported by the UE 102 as indicated in the UE security capabilities included in the step 601 registration request). In step 603, authentication is performed by the UE 102, the AMF 108 and the AUSF 112.

The AMF 108 in step 604 generates a non-access stratum (NAS) security context. The NAS security context is based at least in part on various parameters, such as the selected encryption and integrity algorithms from step 602, the UE security capability, ngKSI, and keys. The AMF 108 in step 605 sends a secure mode command to the UE 102, where the secure mode command includes the selected NAS security algorithms and replayed UE security capabilities.

The UE 102 in step 606 generates the NAS security context, based at least in part on the same parameters discussed above with respect to step 604 (e.g., the selected 5GS encryption and integrity algorithms, UE security capabilities, ngKSI and keys). The UE 102 in step 607 sends a secure mode complete message to the AMF 108. Following this, the AMF 108 in step 608 sends a registration accept message to the UE 102. The UE 102 responds to the AMF 108 in step 609 with a registration complete message.

Figure 7:
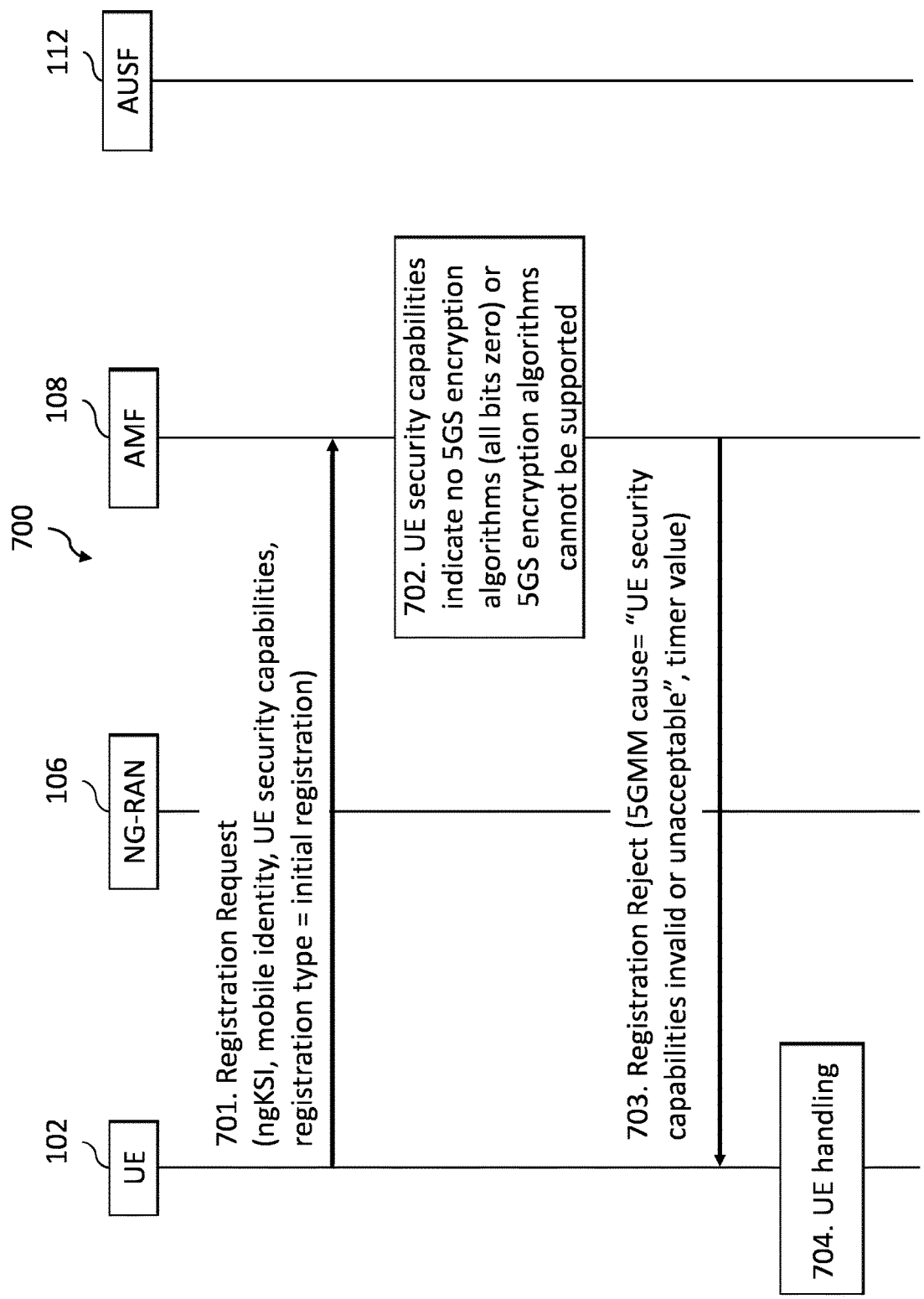
FIG. 7 illustrates a message flow for a security management procedure in a 5G network that results in an unsuccessful initial registration according to one or more illustrative embodiments.

FIG. 7 illustrates a message flow 700 for a security management procedure in a 5G network that results in an unsuccessful initial registration (e.g., when the UE security capabilities indicate that no 5GS encryption algorithms are supported by the UE 102, or that the 5GS encryption algorithms supported by the UE 102 are not supported by the AMF 108). The message flow 700 begins with the UE 102 sending a registration request to the AMF 108 in step 701. The step 701 registration request, similar to the registration request in step 601 of message flow 600, includes ngKSI, a mobile identity, UE security capabilities and a registration type (which is assumed to be an initial registration in the message flow 700).

In step 702, the AMF 108 determines that the UE security capabilities in the registration request are not acceptable. This may be a result of the UE security capabilities indicating that no 5GS encryption algorithms are supported by the UE 102 (e.g., case 506-1 in FIG. 5B where the bitmap includes all zeros for the 5GS encryption algorithms), or that the 5GS encryption algorithms supported by the UE 102 cannot be supported by the AMF 108 (e.g., case 506-3 in FIG. 5B where the bitmap includes a zero for a mandatory 5GS encryption algorithm). As a result of the step 702 determination, the AMF 108 sends a registration reject message to the UE 102 in step 703. The registration reject message includes the 5GMM cause "UE security capabilities invalid or unacceptable" along with a timer value as described above. In step 704, the UE 102 handles the registration reject message. UE 102 processing or handling of the registration reject message will be described in further detail below in conjunction with FIG. 11.

Figure 8:
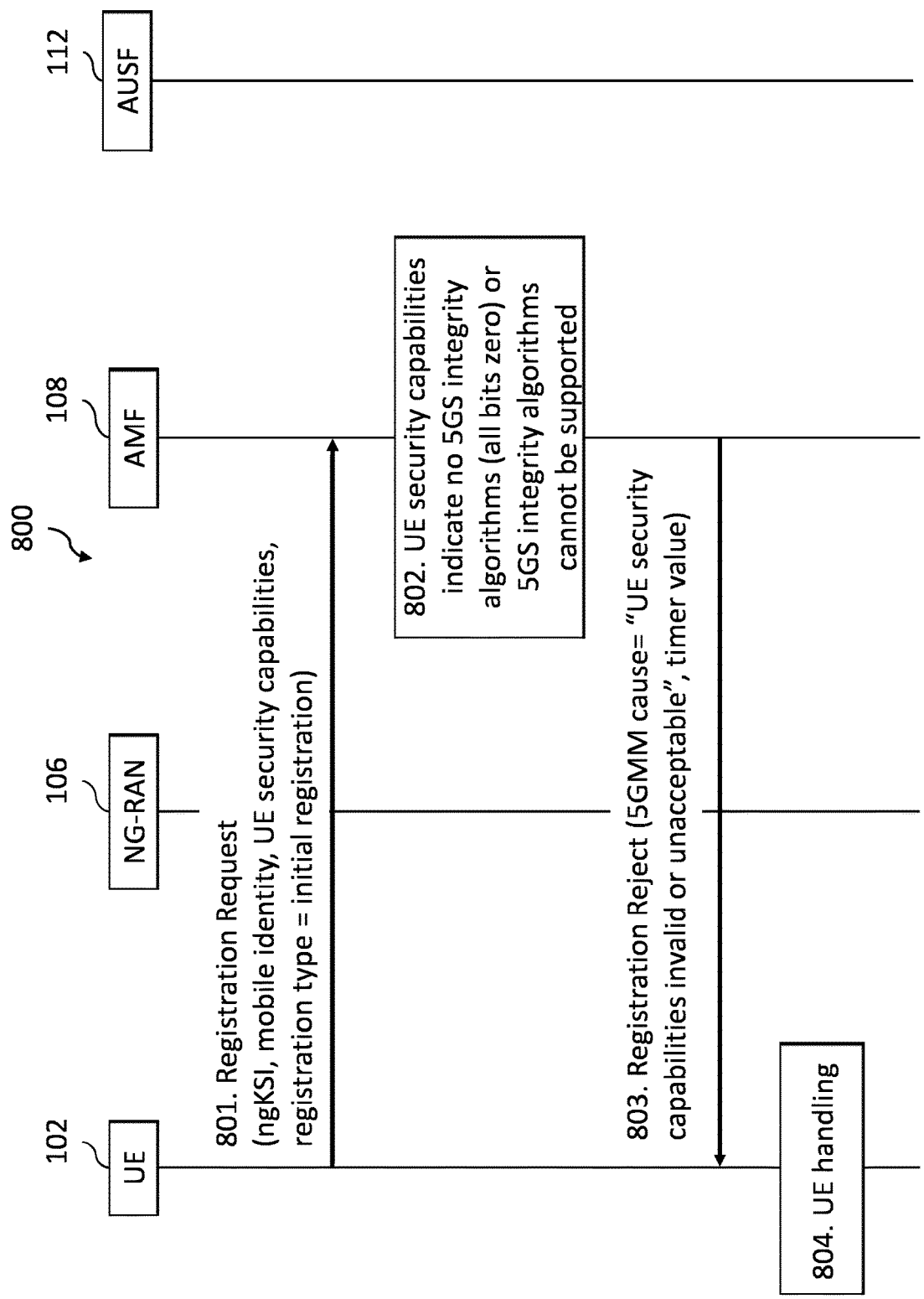
FIG. 8 illustrates a message flow for a security management procedure in a 5G network that results in an unsuccessful initial registration according to one or more illustrative embodiments.

FIG. 8 illustrates a message flow 800 for a security management procedure in a 5G network that results in an unsuccessful initial registration (e.g., when the UE security capabilities indicate that no 5GS integrity algorithms are supported by the UE 102, or that the 5GS integrity algorithms supported by the UE 102 are not supported by the AMF 108). The message flow 800 begins with the UE 102 sending a registration request to the AMF 108 in step 801. The step 801 registration request, similar to the registration request in step 601 of message flow 600 and the registration request in step 701 of message flow 700, includes ngKSI, a mobile identity, UE security capabilities and a registration type (which is assumed to be an initial registration in the message flow 800).

In step 802, the AMF 108 determines that the UE security capabilities in the registration request are not acceptable. This may be a result of the UE security capabilities indicating that no 5GS integrity algorithms are supported by the UE 102 (e.g., case 506-2 in FIG. 5B where the bitmap includes all zeros for the 5GS integrity algorithms), or that the 5GS integrity algorithms supported by the UE 102 cannot be supported by the AMF 108 (e.g., case 506-4 in FIG. 5B where the bitmap includes a zero for a mandatory 5GS integrity algorithm). As a result of the step 802 determination, the AMF 108 sends a registration reject message to the UE 102 in step 803. The registration reject message includes the 5GMM cause "UE security capabilities invalid or unacceptable" along with a timer value as described above. In step 804, the UE 102 handles the registration reject message. UE 102 processing or handling of the registration reject message will be described in further detail below in conjunction with FIG. 11.

Methods for handling UE security capability indications and change during mobility events in a 5G network will now be described. A mobility event may include handover from a source AMF to a target AMF. The target AMF checks the UE security capability indication during mobility, and rejects the mobility request (e.g., a registration request with registration type mobility) if the UE security capabilities are not acceptable.

When initiating a mobility registration request, the UE (e.g., UE 102) indicates supported 5GS encryption and integrity algorithms in the UE security capability IE in the registration request message. The target AMF performs UE security context retrieval from the source AMF, as indicated by the UE's 5G globally unique temporary identity (5G-GUTI). The target AMF receives from the source AMF the UE's security context, which includes security keys, the UE's security capabilities, and selected security algorithms. If the UE security capabilities are unchanged (e.g., the UE security capabilities received in the UE registration request message are the same as the UE security capabilities received from the source AMF), and if the previously selected security algorithms received from the source AMF can be supported by the target AMF, the target AMF reuses the existing keys from the received security context.

If the UE security capabilities are changed (e.g., the UE security capabilities received in the UE registration request message are different than the UE security capabilities received from the source AMF), the target AMF performs additional processing to determine whether to reject the mobility registration request. If the UE-indicated 5GS encryption and integrity algorithms are valid, and either the UE or the target AMF cannot support the previously-selected security algorithms, the target AMF selects new security algorithms and re-authenticates the UE to establish new security contexts. If the UE-indicated 5GS encryption and integrity algorithms are not valid or not acceptable, the target AMF rejects the UE's mobility registration request. The target AMF, or more generally target network, sets the 5GMM cause value to "UE security capabilities invalid or unacceptable" or a generic failure cause code (e.g., UE security capabilities mismatch or Protocol error, unspecified, etc./) and assigns a back-off timer Txxxx in a manner similar to that described above in the context of handling the initial registration request. The UE behavior and back-off handling mechanisms in response to the rejection of the mobility registration request are similar to those described above in the context of the rejection of the initial registration request.

Figure 9A:
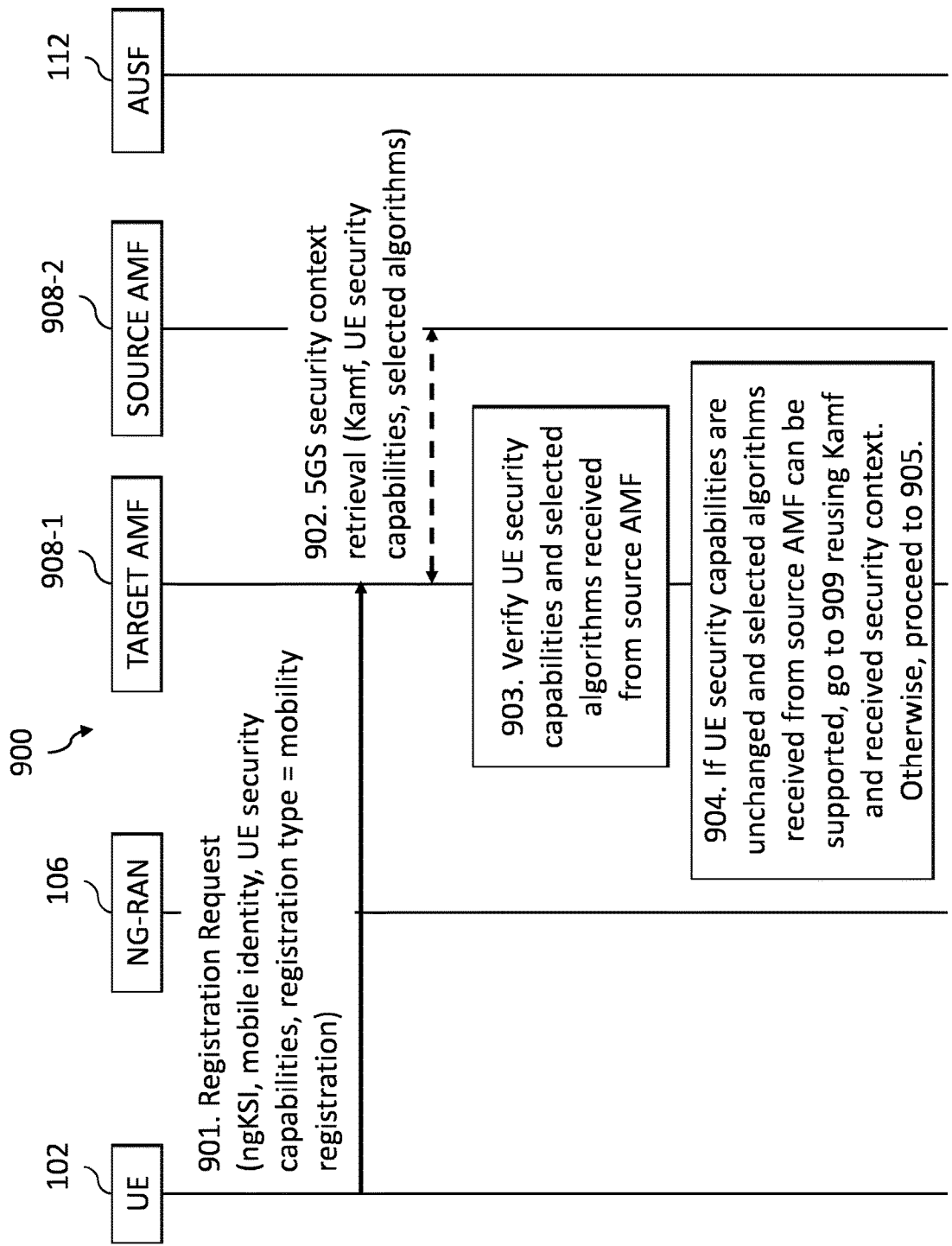
FIGS. 9A through 9C illustrate a message flow for a security management procedure in a 5G network that results in a successful mobility registration according to one or more illustrative embodiments.
Figure 9B:
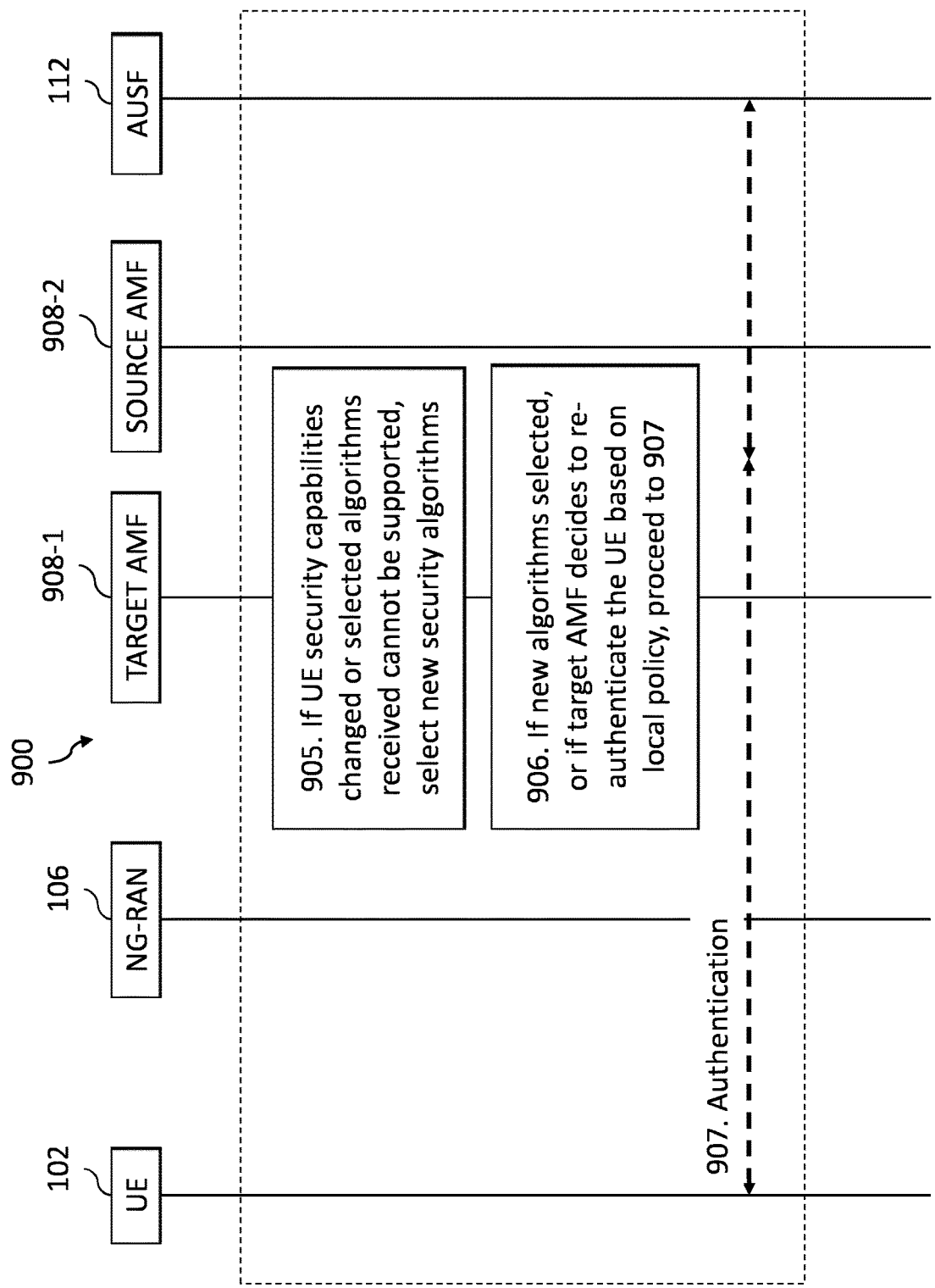
Figure 9C:
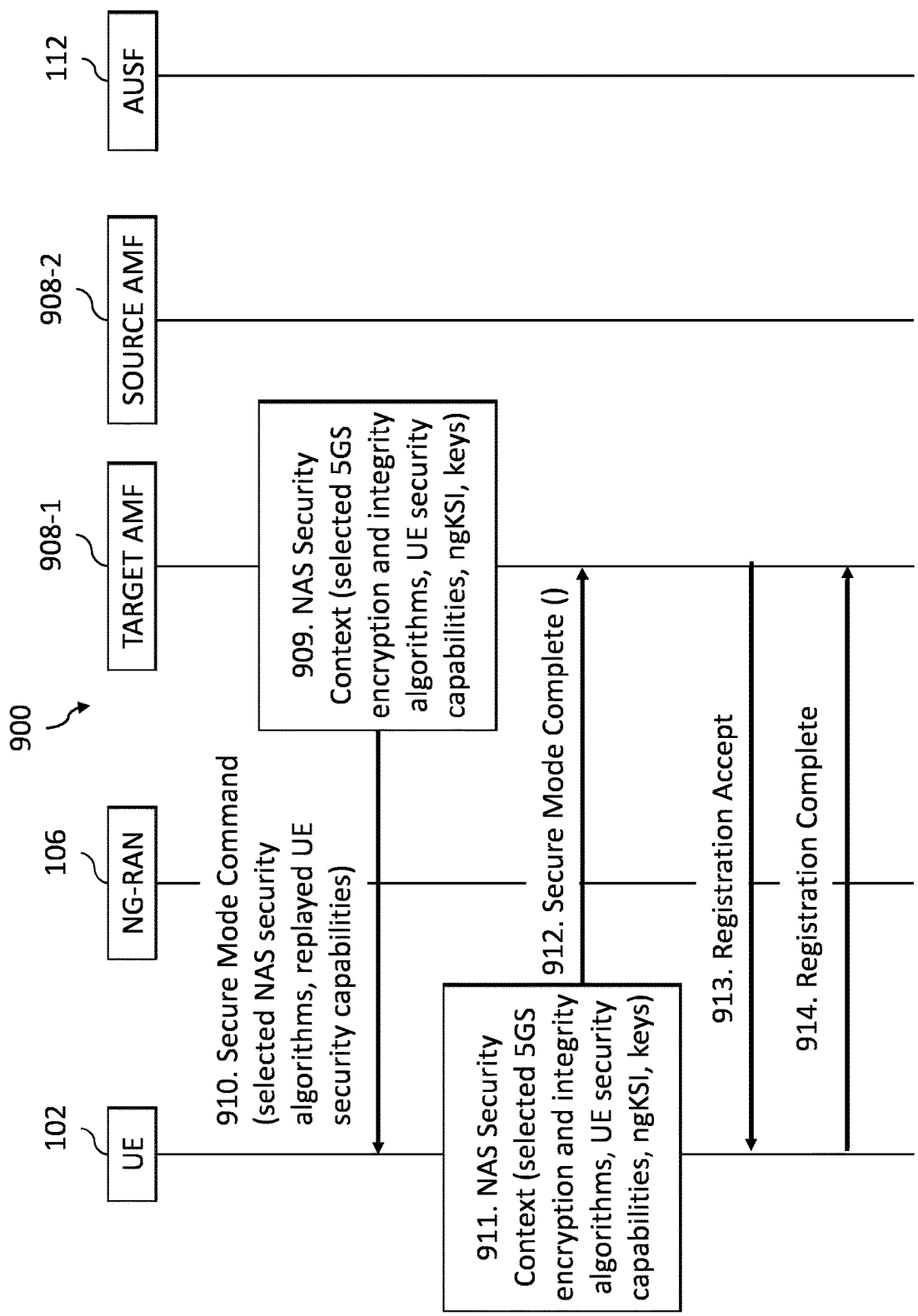

FIGS. 9A through 9C illustrate a message flow 900 for a security management procedure in a 5G network that results in a successful mobility registration. In step 901, the UE 102 sends a registration request to the target AMF 908-1. The registration request includes various parameters, such as ngKSI, a mobile identity, UE security capabilities, and a registration type (e.g., which is assumed to be mobility registration in the message flow 900). In step 902, the target AMF 908-1 obtains from the source AMF 908-2 the 5GS security context previously established for the UE 102. The 5GS security context includes a key Kamf, the UE security capabilities previously reported by the UE 102 to the source AMF 908-2, and the security algorithms (e.g., 5GS encryption and integrity algorithms) selected by the source AMF 908-2 for the UE 102.

In step 903, the target AMF 908-1 verifies whether the UE security capabilities have changed (e.g., whether the UE security capabilities indicated in the step 901 registration request are the same as the security capabilities retrieved from the source AMF 908-2), and verifies whether the previously-selected security algorithms from the source AMF 908-2 are valid and supported by the target AMF

908-1. In step 904, if the UE security capabilities are unchanged and the previously-selected security algorithms received from the source AMF 908-2 are valid and can be supported by the target AMF 908-1, the message flow 900 proceeds to step 909 where Kamf and the received security context are reused. Otherwise, the message flow 900 proceeds to step 905.

The target AMF 908-1 in step 905 selects new security algorithms. Step 905 is performed in response to various conditions, such as the UE security capabilities being changed, or the previously-selected security algorithms not being acceptable to the target AMF 908-1. The target AMF 908-1 in step 906 decides to re-authenticate the UE 102 if new algorithms are selected in step 905, or if the target AMF 908-1 otherwise decides to re-authenticate the UE 102 based at least in part on local policy of the target AMF 908-1 (or more generally, the target network). The message flow 900 then proceeds to step 907, where the UE 102, target AMF 908-1 and AUSF 112 perform authentication. The processing of steps 905 through 907 may be skipped in some instances (e.g., where the security capabilities are unchanged and the previously-selected security algorithms are acceptable to the target AMF 908-1), and thus these steps are shown in dashed outline in FIG. 9B.

The message flow 900 proceeds with steps 909 through 914, which are similar to steps 604 through 609, respectively, in the message flow 600. The target AMF 908-1 generates the NAS security context in step 909 and sends the secure mode command to the UE 102 in step 910. The UE 102 generates the NAS security context in step 911 and sends the secure mode complete message to the target AMF 908-1 in step 912. The target AMF 908-1 sends a registration accept message to the UE 102 in step 913, and the UE 102 sends a registration complete message to the target AMF 908-1 in step 914.

Figure 10:
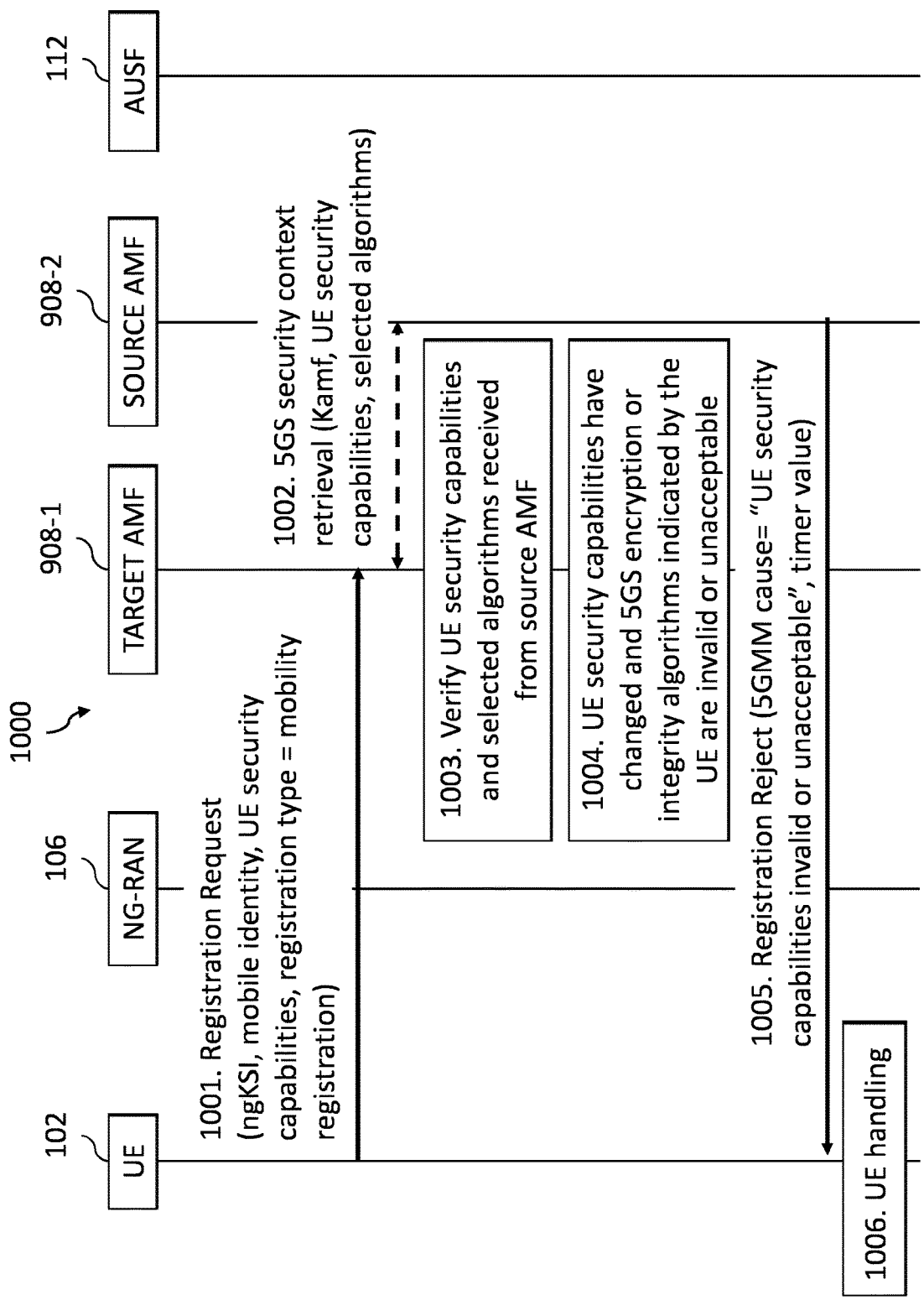
FIG. 10 illustrates a message flow for a security management procedure in a 5G network that results in an unsuccessful mobility registration according to one or more illustrative embodiments.

FIG. 10 illustrates a message flow 1000 for a security management procedure in a 5G network that results in an unsuccessful mobility registration. The mobility registration may be unsuccessful due to the UE security capabilities changing to 5GS encryption and integrity algorithms that are invalid, not supported or otherwise unacceptable to the target AMF 908-1. The message flow 1000 begins with step 1001, where the UE 102 sends a registration request to the target AMF 908-1. The step 1001 registration request, similar to the registration request 901 in message flow 900, includes parameters such as ngKSI, a mobile identity, UE security capabilities, and a registration type indicating mobility registration. In step 1002, the target AMF 908-1 retrieves the 5GS security context from the source AMF 908-2 in a manner similar to that described above with respect to step 902 of message flow 900.

The target AMF 908-1 in step 1003 verifies the UE security capabilities and selected algorithms retrieved from the source AMF 908-2 in step 1002. The target AMF 908-1 in step 1004 determines that the UE security capabilities have changed, and that the 5GS encryption or integrity algorithms (or combinations thereof) indicated by the UE 102 in the step 1001 registration request are invalid, not supported or otherwise not acceptable to the target AMF 908-1 (or, more generally, the target network). The target AMF 908-1 sends a registration reject message to the UE 102 in step 1005. The registration reject message includes the 5GMM cause "UE security capabilities invalid or unacceptable" along with a timer value. In step 1006, the UE 102 handles the registration reject message. UE 102 processing or handling of the registration reject message will be described in further detail below in conjunction with FIG. 11.

Figure 11:
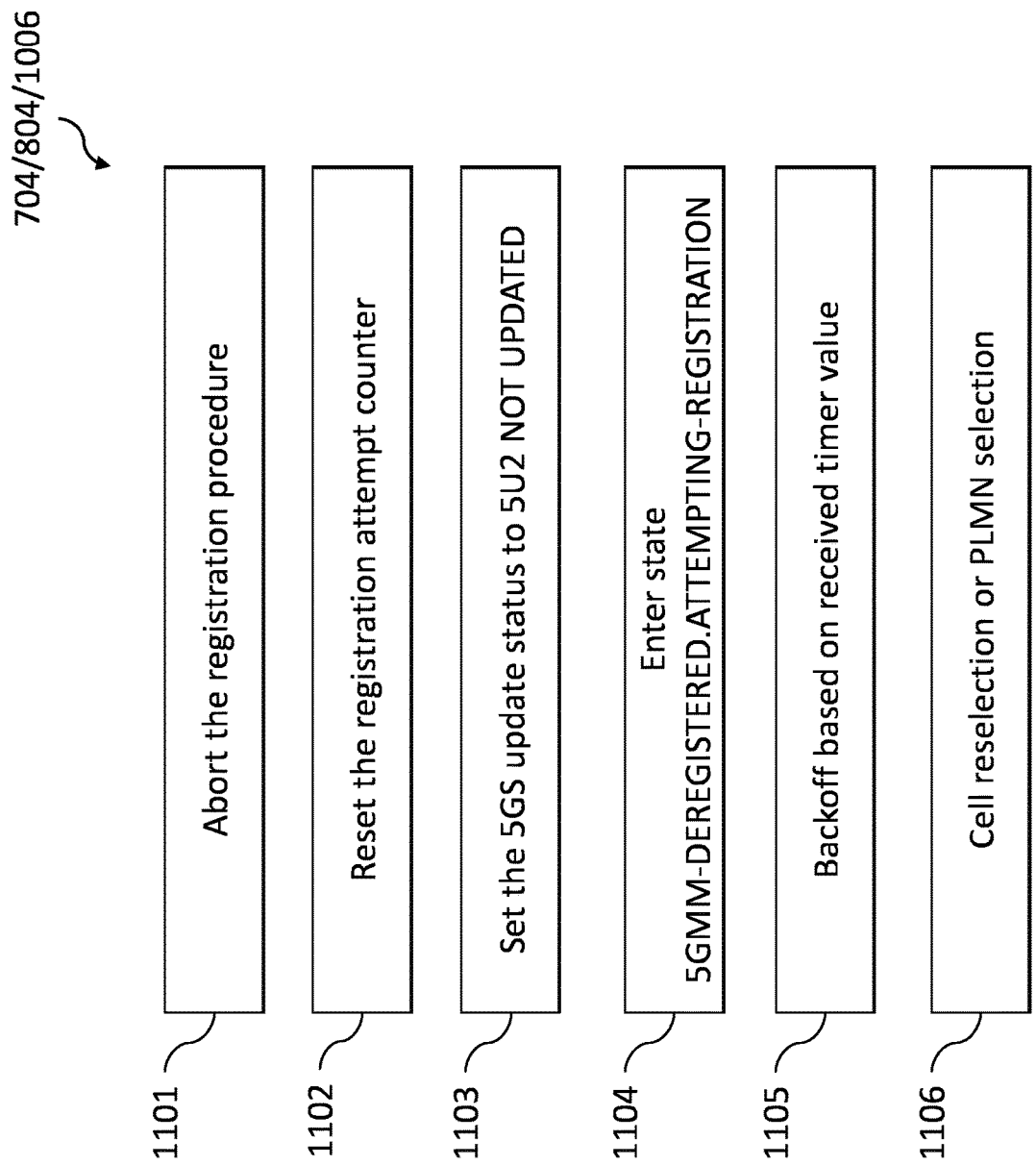
FIG. 11 illustrates a security management procedure in a 5G network for UE handling following an unsuccessful initial or mobility registration according to one or more illustrative embodiments.

FIG. 11 illustrates a security management procedure in a 5G network for UE handling following an unsuccessful initial registration (e.g., step 704 in message flow 700 or step 804 in message flow 800) or mobility registration (e.g., step 1006 in message flow 1000). In step 1101, the UE 102 aborts the registration procedure (which is an initial registration procedure in message flows 700 and 800, and a mobility registration procedure in message flow 1000). The UE 102 resets the registration attempt counter in step 1102, and sets the 5GS update status to "5U2 NOT UPDATED" in step 1103. The UE 102 then enters the state "5GMM-DEREGISTERED.ATTEMPTING-REGISTRATION" in step 1104. The UE 102 performs backoff based at least in part on the received timer value (e.g., from the registration reject message in step 703, 803 or 1005). The UE 102 performs cell reselection or PLMN selection in step 1106.

Methods for enabling a 4G network to reject a user device if the indicated UE EPS security capabilities (e.g., EPS encryption algorithms, EPS integrity algorithms, combinations thereof) are not acceptable will now be described. Logic is added (e.g., in a MME such as MME 308) to enable the 4G network to check the UE security capability indication during UE attach and handover, and to reject the request if the UE security capabilities are not acceptable (e.g., due to the supported EPS encryption algorithms, EPS integrity algorithms, or combinations thereof indicated by the UE not being acceptable to the 4G network). When initiating an attach request, the UE (e.g., UE 102) indicates supported EPS encryption and integrity algorithms in the UE network capability IE in the attach request message. If the UE-indicated EPS encryption or integrity algorithms (or combinations thereof) are not valid or acceptable to the 4G network, the 4G network rejects the attach request. To do so, the 4G network sets the EPS mobility management (EMM) cause value to "UE security capabilities invalid or unacceptable" or a generic failure cause code (e.g., UE security capabilities mismatch or Protocol error, unspecified, etc.) and assigns a back-off timer Txxxx.

The UE-indicated EPS encryption or integrity algorithms can be unacceptable by the 4G network for various reasons. FIG. 12B shows examples of different cases where the EPS encryption algorithm bitmap 1204 is unacceptable to the 4G network. Bitmap 1206-1 illustrates a first case, where the EPS encryption algorithm bits are all zero (e.g., no EPS encryption algorithms are supported by the UE). Bitmap 1206-2 illustrates a second case, where the EPS integrity algorithm bits are all zero (e.g., no EPS integrity algorithms are supported by the UE). Bitmap 1206-3 illustrates a third case, where the bit for a mandatory EPS encryption algorithm is zero (e.g., 128-EEA1 is not supported by the UE). Bitmap 1206-4 illustrates a fourth case, where the bit for a mandatory EPS integrity algorithm is zero (e.g., 128-EIA1 is not supported by the UE). It should be appreciated, however, that various other unsupported cases are possible. For example, in some cases the EPS encryption algorithm bitmap 1204 will indicate that the UE does not support a valid combination of EPS encryption and integrity algorithms (e.g., the UE supports 128-EEA1 but not 128-EIA1).

Figure 12C:
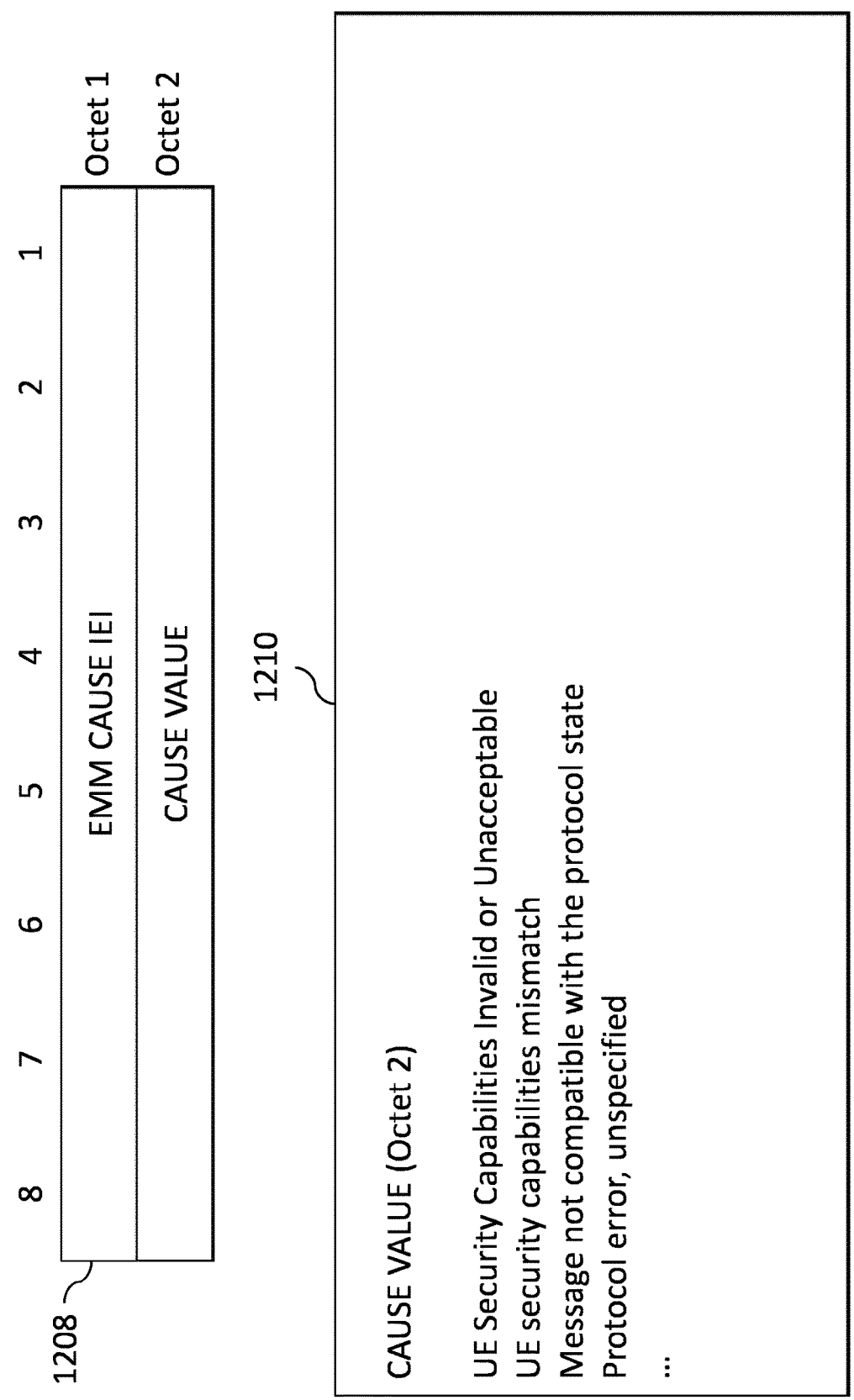
FIG. 12C illustrate examples of EMM cause value formatting according to one or more illustrative embodiments.

A new cause code can be defined to enable the network to indicate to the UE that the registration or handover failure is due to the UE-indicated security capabilities not being acceptable or alternatively a generic failure cause code can be used to signal attach or handover failure to the UE. The EMM cause IE indicates the reason why an EMM request from a UE is rejected by the network. FIG. 12C shows an example EMM cause IE 1208. A new failure cause code, is defined to signal attach or handover failure to the UE due to the UE security capabilities not being acceptable or alternatively a generic failure cause code can be used to signal attach or handover failure to the UE. The EMM cause is sent to the UE if the network detects that the security capabilities indicated by the UE are unacceptable (e.g., one of cases 1206-1, 1206-2, 1206-3 and 1206-4 described above, or another cause of invalid or unacceptable UE-indicated support for EPS encryption and integrity algorithms). The EMM cause is signaled using the EMM cause IE 1208 as shown in table 1210 in FIG. 12C.

UE behavior and back-off handling mechanisms will now be described. If the UE's attach request cannot be accepted by the network due to the UE-indicated security capabilities not being valid or acceptable, the MME sends an attach reject message to the UE including an appropriate EMM cause value (e.g., the new EMM cause value described above, "UE security capabilities invalid or unacceptable"). When the UE receives an attach reject message including the EMM cause value indicating that the UE security capabilities are invalid or unacceptable, the UE takes the following actions. The UE will abort the attach procedure (e.g., either an initial attach or a mobility attach via a tracking area update request) and reset the attach attempt counter. The UE also sets the EPS update status to "EU2 NOT UPDATED" and enters state "EMM-DEREGISTERED.ATTEMPTING-TO-ATTACH."

If the attach reject message includes a timer value (e.g., a Txxxx value IE) that indicates that the timer is neither zero nor deactivated, the UE will stop the timer Txxxx if it is running Otherwise, the UE will start the timer Txxxx with a random value from a default range (e.g., 15 to 30 minutes). The UE stays in the current serving cell and applies the normal cell reselection process. When timer Txxxx expires or is stopped, the UE may re-attempt an attach procedure with updated UE security capability indication in UE network capability IE.

Figure 13A:
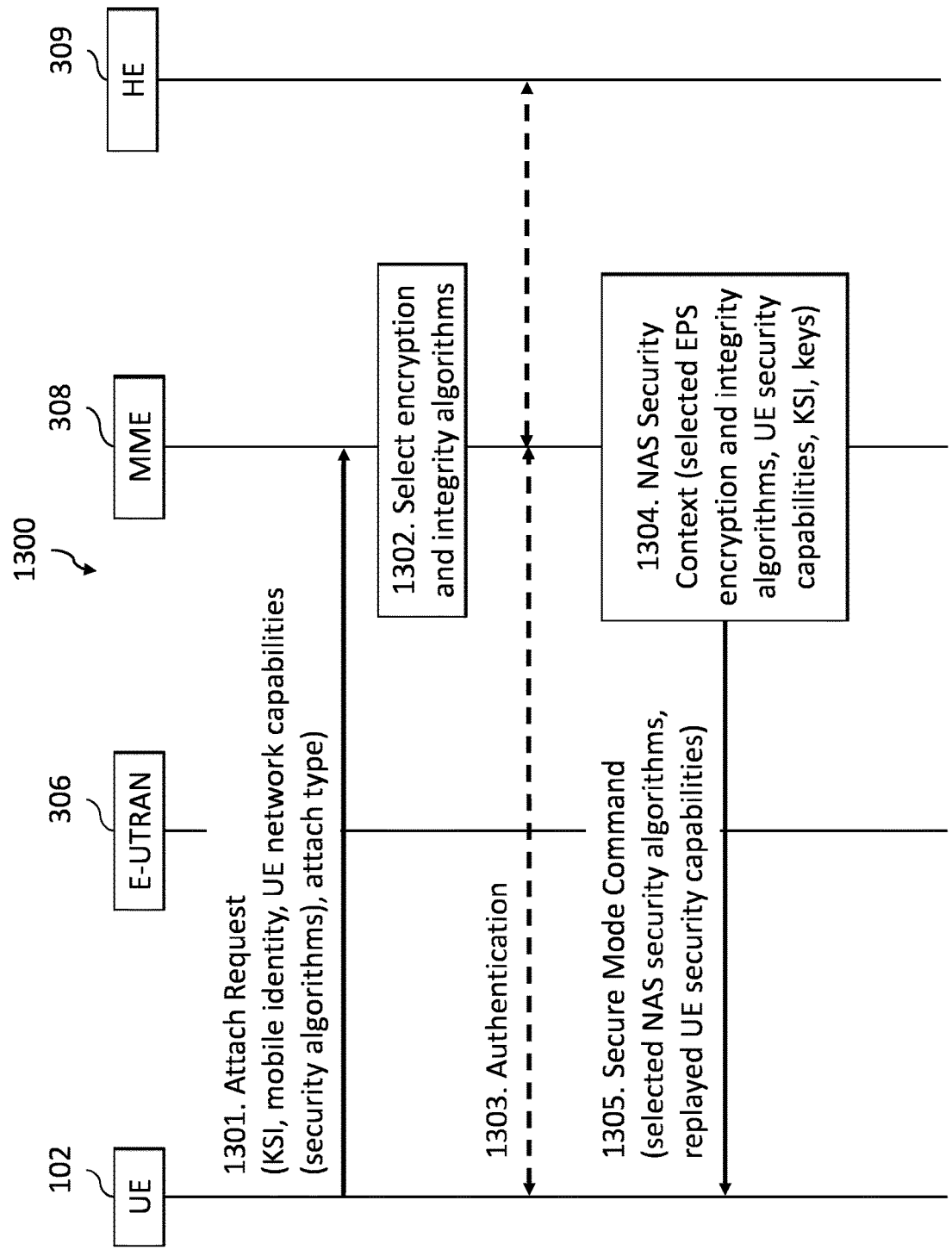
FIGS. 13A and 13B illustrate a message flow for a security management procedure in a 4G network that results in a successful initial attach according to one or more illustrative embodiments.
Figure 13B:
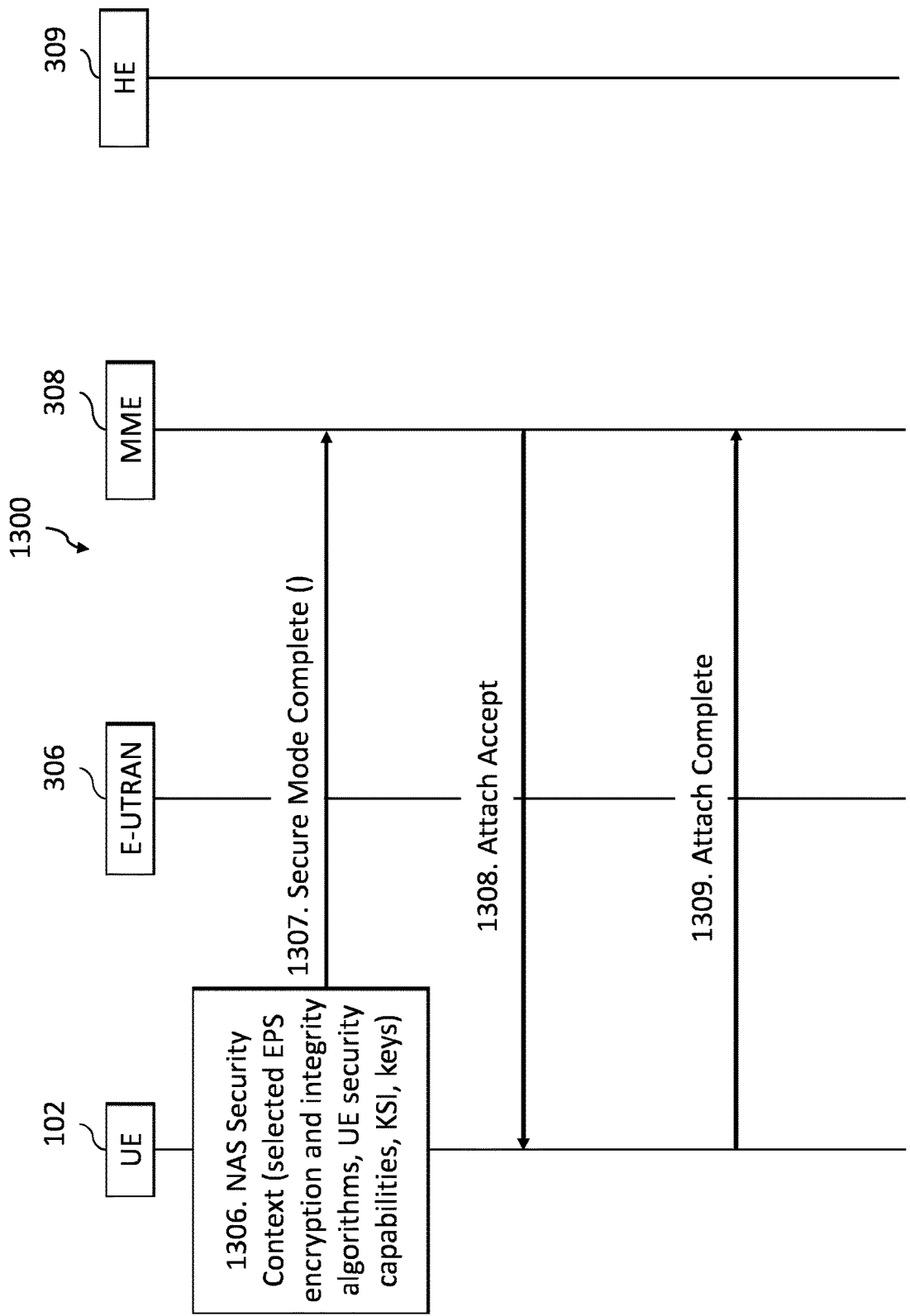

FIGS. 13A and 13B illustrate a message flow 1300 for a security management procedure in a 4G network that results in a successful initial attach. The message flow 1300 begins with the UE 102 sending an attach request to MME 308 in step 1301. The attach request includes various parameters including a key set identifier (KSI), a mobile identity, UE network capabilities (e.g., supported security algorithms) and an attach type (which is assumed to be an initial attach in the message flow 1300). In step 1302, the MME 308 selects encryption and integrity algorithms from among those indicated as supported by the UE in the attach request that are valid and acceptable to the 4G network. Authentication is then performed in step 1303 by the UE 102, the MME 308, and the home environment (HE) 309 (e.g., a home PLMN of the subscriber of UE 102).

The MME 308 in step 1304 generates a NAS security context. The NAS security context is based at least in part on various parameters, such as the selected EPS encryption and integrity algorithms, the UE security capabilities, KSI, and keys. The MME 308 in step 1305 sends a secure mode command to the UE 102, where the secure mode command includes the selected NAS security algorithms and replayed UE security capabilities.

The UE 102 in step 1306 generates the NAS security context, based at least in part on the same parameters discussed above with respect to step 1304 (e.g., the selected EPS encryption and integrity algorithms, UE security capability, KSI and keys). The UE 102 in step 1307 sends a secure mode complete message to the MME 308. Following this, the MME 308 in step 1308 sends an attach accept message to the UE 102. The UE 102 responds to the MME 308 in step 1309 with an attach complete message.

Figure 14:
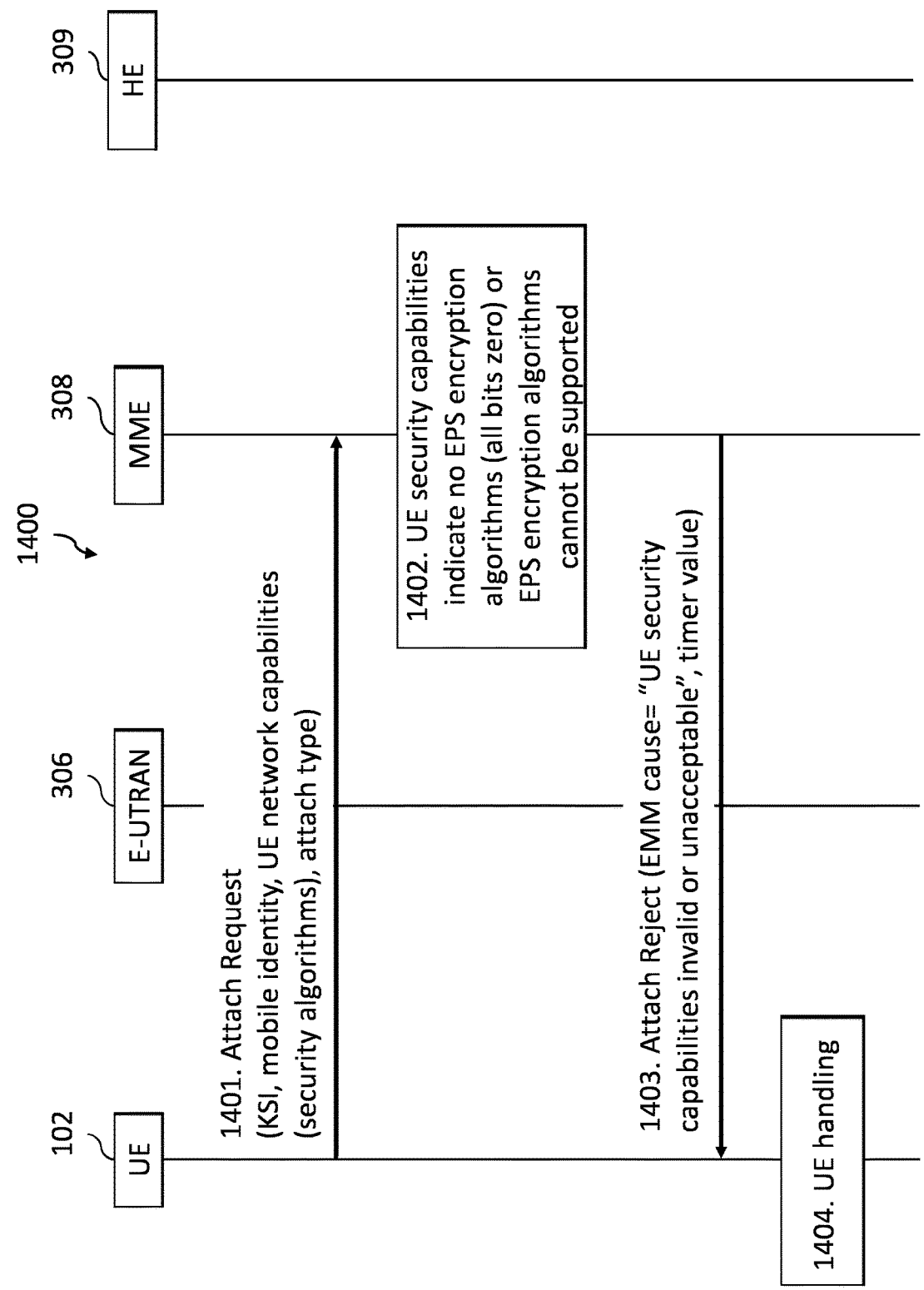
FIG. 14 illustrates a message flow for a security management procedure in a 4G network that results in an unsuccessful initial attach according to one or more illustrative embodiments.

FIG. 14 illustrates a message flow 1400 for a security management procedure in a 4G network that results in an unsuccessful initial attach (e.g., when the UE security capabilities indicate that no EPS encryption algorithms are supported by the UE 102, or that the EPS encryption algorithms supported by the UE 102 are not supported by the MME 308). The message flow 1400 begins with the UE 102 sending an attach request to the MME 308 in step 1401. The step 1401 attach request, similar to the attach request in step 1301 of message flow 1300, includes KSI, a mobile identity, UE network capabilities (e.g., supported security algorithms) and an attach type (e.g., EPS attach, or combined EPS/international mobile subscriber identity (IMSI) attach, etc. in the message flow 1400).

In step 1402, the MME 308 determines that the UE security capabilities in the attach request are not acceptable. This may be a result of the UE security capabilities indicating that no EPS encryption algorithms are supported by the UE 102 (e.g., case 1206-1 in FIG. 12B where the bitmap includes all zeros for the EPS encryption algorithms), or that the EPS encryption algorithms supported by the UE 102 cannot be supported by the MME 308 (e.g., case 1206-3 in FIG. 5B where the bitmap includes a zero for a mandatory EPS encryption algorithm). As a result of the step 1402 determination, the MME 308 sends an attach reject message to the UE 102 in step 1403. The attach reject message includes the EMM cause "UE security capabilities invalid or unacceptable" along with a timer value as described above. In step 1404, the UE 102 handles the attach reject message. UE 102 processing or handling of the attach reject message will be described in further detail below in conjunction with FIG. 18.

Figure 15:
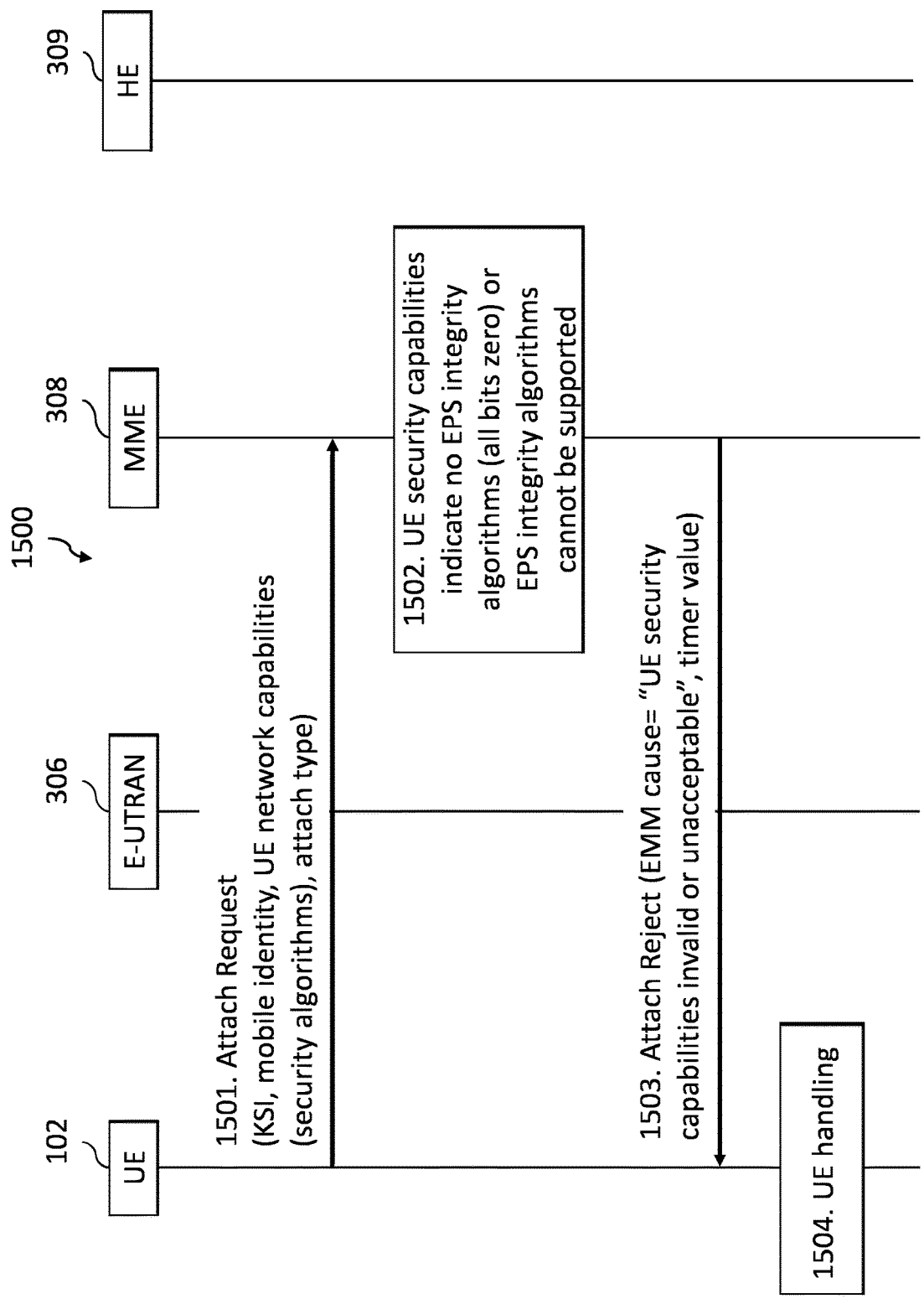
FIG. 15 illustrates a message flow for a security management procedure in a 4G network that results in an unsuccessful initial attach according to one or more illustrative embodiments.

FIG. 15 illustrates a message flow 1500 for a security management procedure in a 4G network that results in an unsuccessful initial attach (e.g., when the UE security capabilities indicate that no EPS integrity algorithms are supported by the UE 102, or that the EPS integrity algorithms supported by the UE 102 are not supported by the MME 308). The message flow 1500 begins with the UE 102 sending an attach request to the MME 308 in step 1501. The step 1501 attach request, similar to the attach request in step 1301 of message flow 1300 and the attach request in step 1401 of message flow 1400, includes KSI, a mobile identity, UE network capabilities (e.g., supported security algorithms) and an attach type (which is assumed to be an initial attach in the message flow 1500).

In step 1502, the MME 308 determines that the UE security capabilities in the attach request are not acceptable. This may be a result of the UE security capabilities indicating that no EPS integrity algorithms are supported by the UE 102 (e.g., case 1206-2 in FIG. 12B where the bitmap includes all zeros for the EPS integrity algorithms), or that the EPS integrity algorithms supported by the UE 102 cannot be supported by the MME 308 (e.g., case 1206-4 in FIG. 12B where the bitmap includes a zero for a mandatory EPS integrity algorithm). As a result of the step 1502 determination, the MME 308 sends an attach reject message to the UE 102 in step 1503. The attach reject message includes the EMM cause "UE security capabilities invalid or unacceptable" along with a timer value as described above. In step 1504, the UE 102 handles the attach reject message.

UE 102 processing or handling of the attach reject message will be described in further detail below in conjunction with FIG. 18.

Methods for handling UE security capability indications and changes during mobility in a 4G EPC network will now be described. A mobility event may include handover from a source MME to a target MME (e.g., in conjunction with a tracking area update message sent from the UE to the target MME). The target MME checks the UE security capability indication during mobility, and rejects the mobility request if the UE security capabilities are not acceptable.

When initiating a mobility tracking area update (TAU) request, the UE (e.g., UE 102) indicates supported EPS encryption and integrity algorithms in the UE security capability IE in the TAU request message. The target MME performs UE security context retrieval from the source MME, as indicated by the UE's globally unique temporary identity (GUTI). The target MME receives from the source MME the UE's security context, which includes security keys, the UE's security capabilities, and selected security algorithms. If the UE security capabilities are unchanged (e.g., the UE security capabilities received in the UE's TAU request message are the same as the UE security capabilities received from the source MME), and if the previously selected security algorithms received from the source MME can be supported by the target MME, the target MME reuses the existing keys from the received security context.

If the UE security capabilities are changed (e.g., the UE security capabilities received in the UE's TAU request message are different than the UE security capabilities received from the source MME), the target MME performs additional processing to determine whether to reject the TAU request. If the UE-indicated EPS encryption and integrity algorithms are valid, and either the UE or the target MME cannot support the previously-selected security algorithms, the target MME selects new security algorithms and re-authenticates the UE to establish new security contexts. If the UE-indicated EPS encryption and integrity algorithms are not valid or not acceptable, the target MME rejects the UE's TAU request. The target MME, or more generally target network, sets the EMM cause value to "UE security capabilities invalid or unacceptable" or a generic failure cause code (e.g., UE security capabilities mismatch or Protocol error, unspecified, etc.) and assigns a back-off timer Txxxx in a manner similar to that described above in the context of handling the initial attach request. The UE behavior and back-off handling mechanisms in response to the rejection of the TAU request are similar to those described above in the context of the rejection of the initial attach request.

Figure 16A:
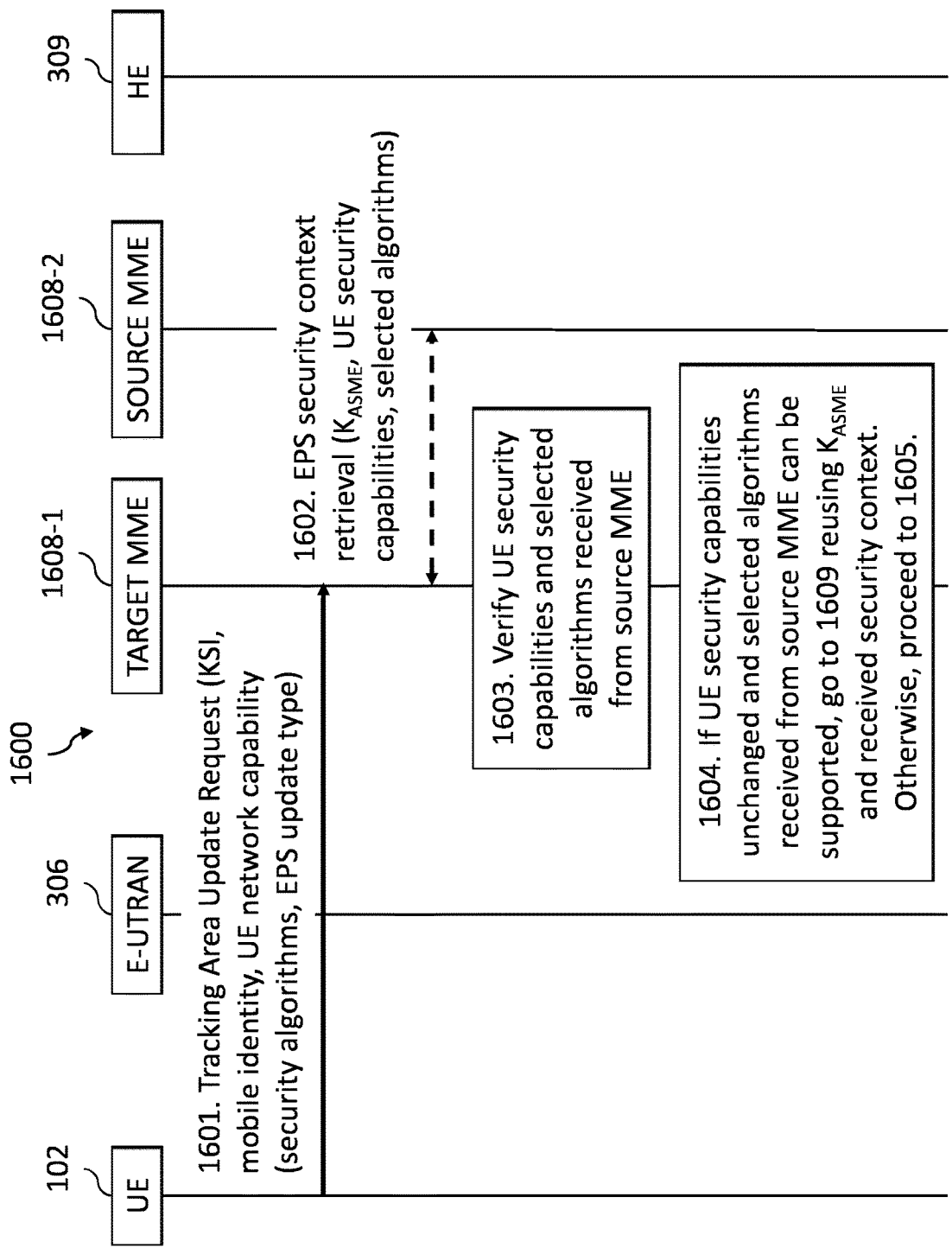
FIGS. 16A through 16C illustrate a message flow for a security management procedure in a 4G network that results in a successful mobility tracking area update according to one or more illustrative embodiments.
Figure 16B:
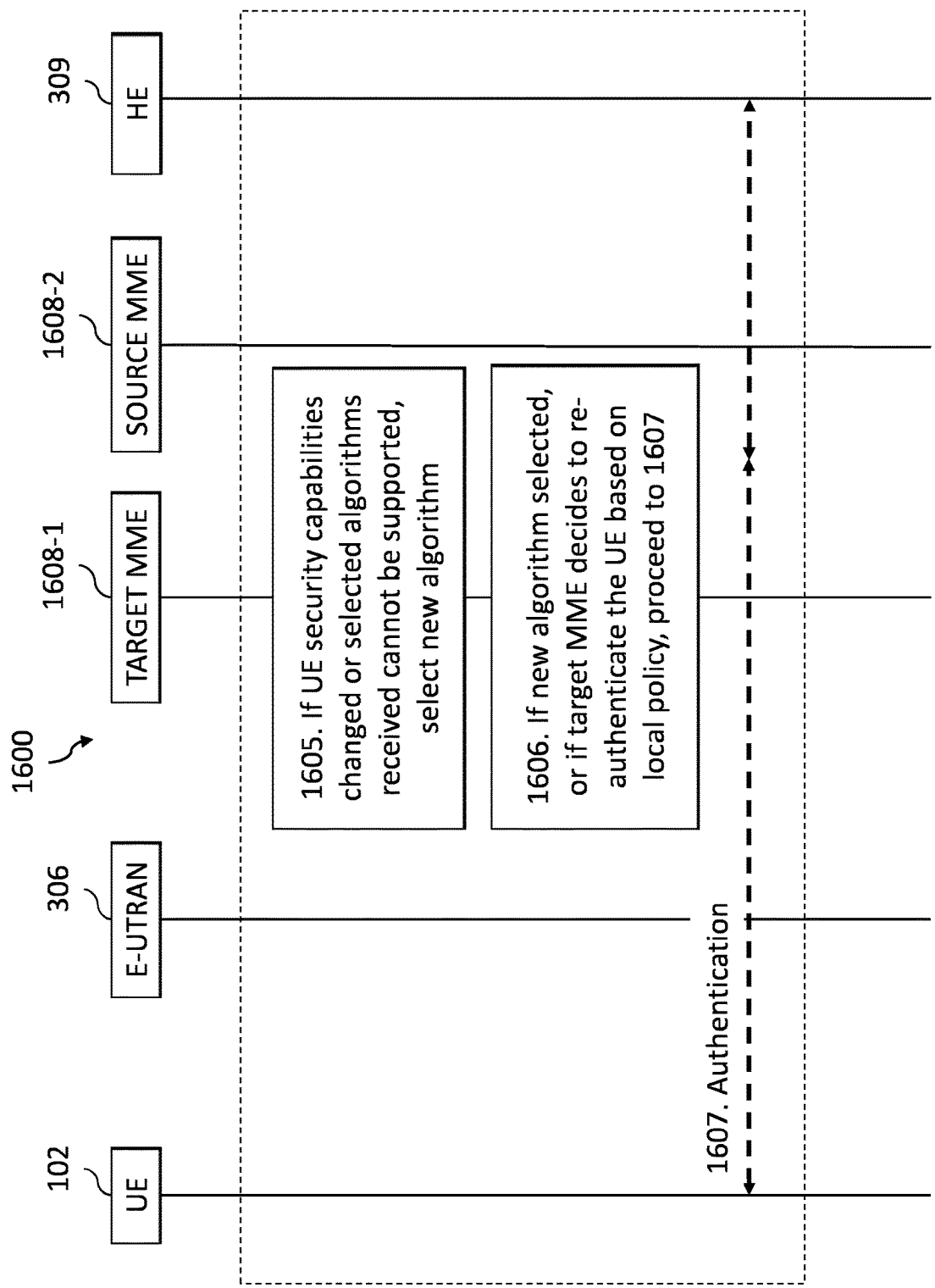
Figure 16C:
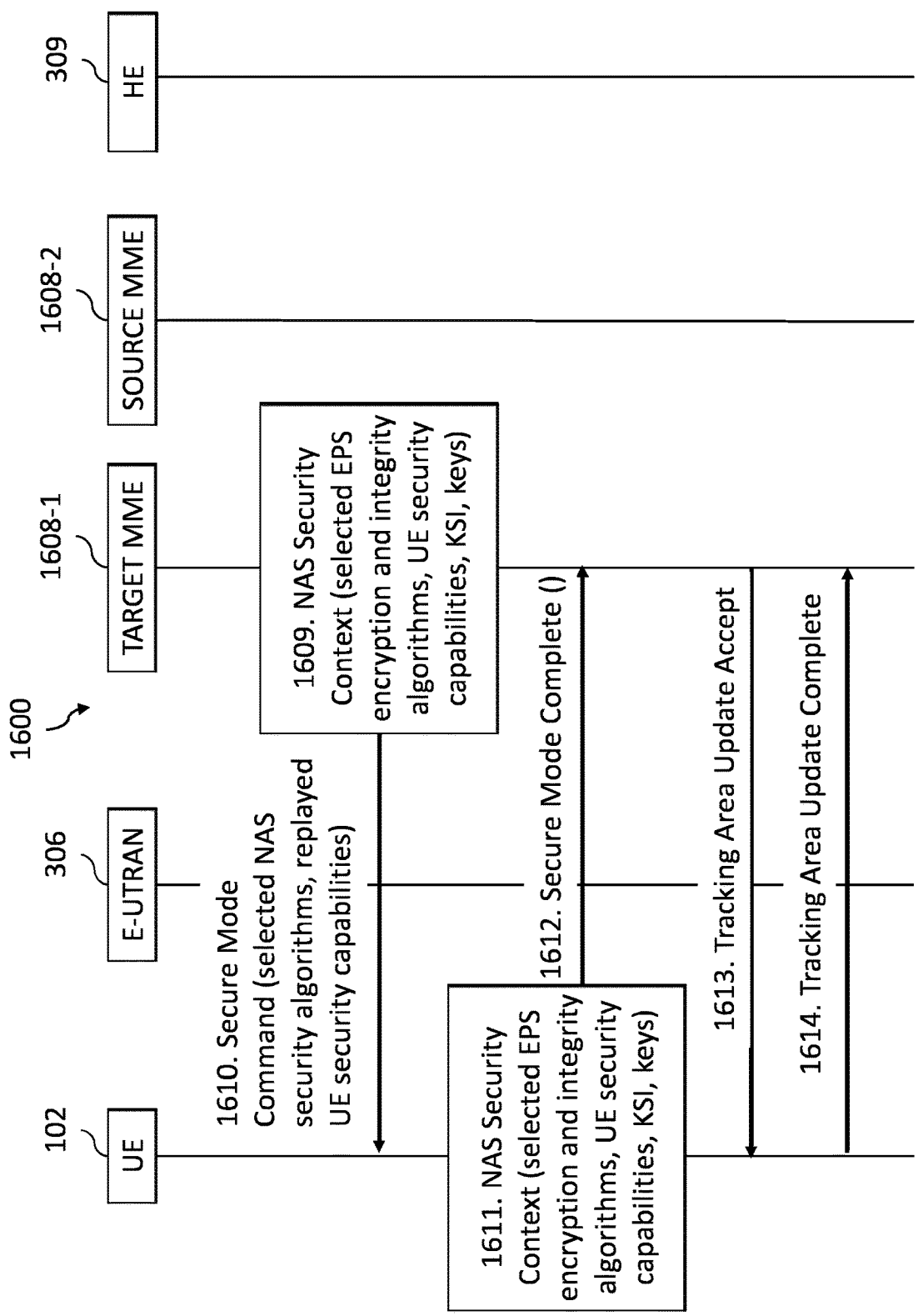

FIGS. 16A through 16C illustrate a message flow 1600 for a security management procedure in a 4G EPC network that results in a successful mobility event. In step 1601, the UE 102 sends a TAU request to the target MME 1608-1. The TAU request includes various parameters, such as KSI, a mobile identity, UE network capability (e.g., security algorithms), and an EPS update type (e.g., tracking area (TA) updating, or combined TA and location area (LA) TA/LA updating with IMSI attach, etc. in the message flow 1600). In step 1602, the target MME 1608-1 obtains from the source MME 1608-2 the EPS security context previously established for the UE 102. The EPS security context includes a key $K_{ASME}$, the UE security capabilities previously reported by the UE 102 to the source MME 1608-2, and the security algorithms (e.g., EPS encryption and integrity algorithms) selected by the source MME 1608-2 for the UE 102.

In step 1603, the target MME 1608-1 verifies whether the UE security capabilities have changed (e.g., whether the UE security capabilities indicated in the step 1601 TAU request are the same as the security capabilities retrieved from the source MME 1608-2), and verifies whether the previously-selected security algorithms from the source MME 1608-2 are valid and supported by the target MME 1608-1. In step 1604, if the UE security capabilities are unchanged and the previously-selected security algorithms received from the source MME 1608-2 are valid and can be supported by the target MME 1608-1, the message flow 1600 proceeds to step 1609 where $K_{ASME}$ and the received security context are reused. Otherwise, the message flow 1600 proceeds to step 1605.

The target MME 1608-1 in step 1605 selects new security algorithms. Step 1605 is performed in response to various conditions, such as the UE security capabilities being changed, or the previously-selected security algorithms not being acceptable to the target MME 1608-1. The target MME 1608-1 in step 1606 decides to re-authenticate the UE 102 if new algorithms are selected in step 1605, or if the target MME 1608-1 otherwise decides to re-authenticate the UE 102 based at least in part on local policy of the target MME 1608-1 (or more generally, the target network). The message flow 1600 then proceeds to step 1607, where the UE 102, target MME 1608-1 and HE 309 perform authentication. The processing of steps 1605 through 1607 may be skipped in some instances (e.g., where the security capabilities are unchanged and the previously-selected security algorithms are acceptable to the target MME 1608-1), and thus these steps are shown in dashed outline in FIG. 16B.

The message flow 1600 proceeds with steps 1609 through 1614, which are similar to steps 1304 through 1309, respectively, in the message flow 1300. The target MME 1608-1 generates the NAS security context in step 1609 and sends the secure mode command to the UE 102 in step 1610. The UE 102 generates the NAS security context in step 1611 and sends the secure mode complete message to the target MME 1608-1 in step 1612. The target MME 1608-1 sends a tracking area update accept message to the UE 102 in step 1613, and the UE 102 sends a tracking area update complete message to the target MME 1608-1 in step 1614.

Figure 17:
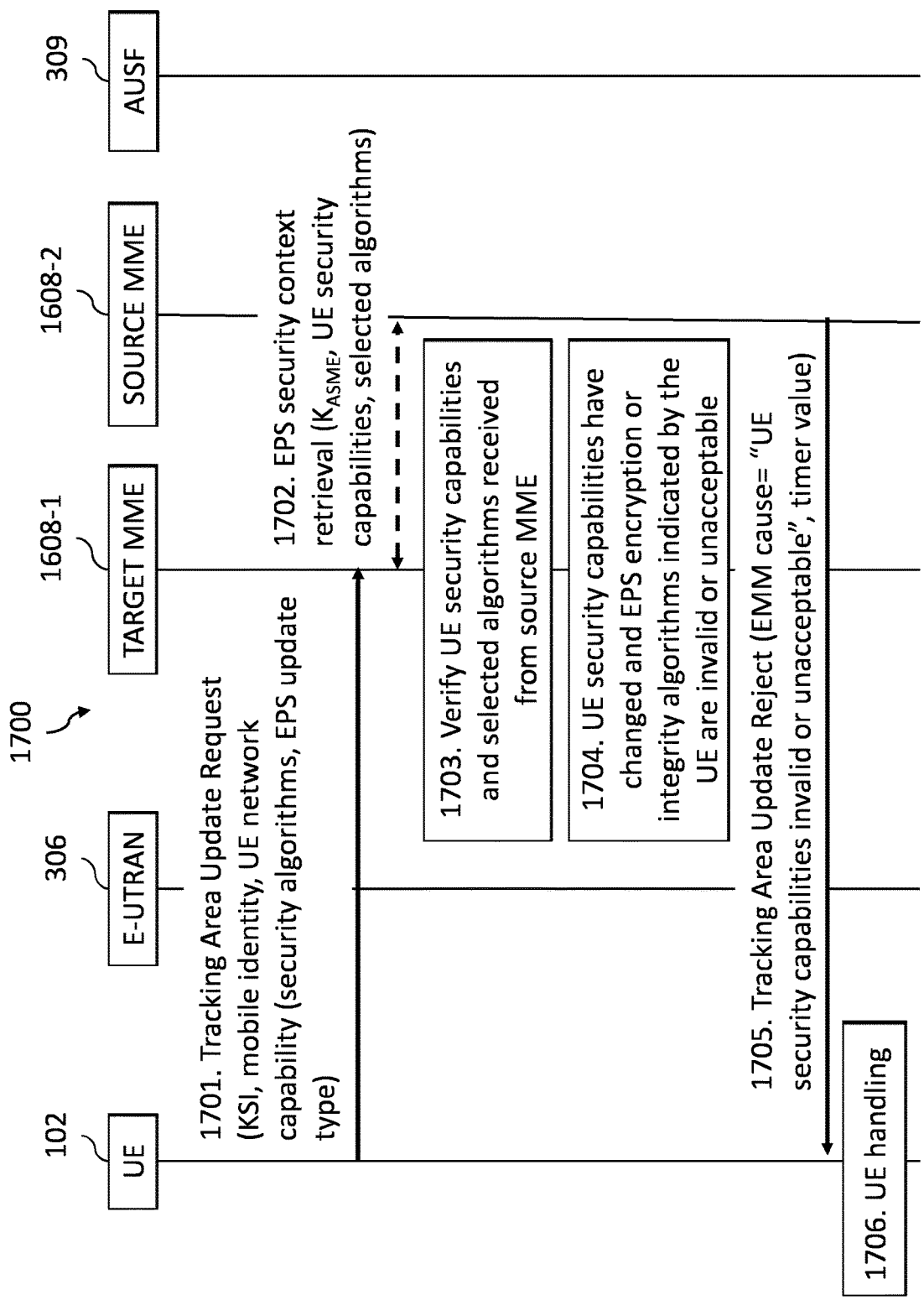
FIG. 17 illustrates a message flow for a security management procedure in a 4G network that results in an unsuccessful mobility tracking area update according to one or more illustrative embodiments.

FIG. 17 illustrates a message flow 1700 for a security management procedure in a 4G EPC network that results in an unsuccessful mobility event. The mobility event may be unsuccessful due to the UE security capabilities changing to EPS encryption and integrity algorithms that are invalid, not supported or otherwise unacceptable to the target MME 1608-1. The message flow 1700 begins with step 1701, where the UE 102 sends a TAU request to the target MME 1608-1. The step 1601 TAU request, similar to the TAU request 1601 in message flow 1600, includes various parameters, such as KSI, a mobile identity, UE network capability (e.g., security algorithms), and a EPS update type (e.g., TA updating, or combined TA/LA updating with IMSI attach, etc. in the message flow 1700). In step 1702, the target MME 1608-1 retrieves the EPS security context from the source MME 1608-2 in a manner similar to that described above with respect to step 1602 of message flow 1600.

The target AMF 1608-1 in step 1703 verifies the UE security capabilities and selected algorithms retrieved from the source MME 1608-2 in step 1702. The target MME 1608-1 in step 1704 determines that the UE security capabilities have changed, and that the EPS encryption or integrity algorithms (or combinations thereof) indicated by the UE 102 in the step 1701 TAU request are invalid, not supported or otherwise not acceptable to the target MME 1608-1 (or, more generally, the target network). The target MME 1608-1 sends a TAU reject message to the UE 102 in step 1705. The attach reject message includes the EMM cause "UE security capabilities invalid or unacceptable" along with a timer value. In step 1706, the UE 102 handles the attach reject message. UE 102 processing or handling of the attach reject message will be described in further detail below in conjunction with FIG. 18.

Figure 18:
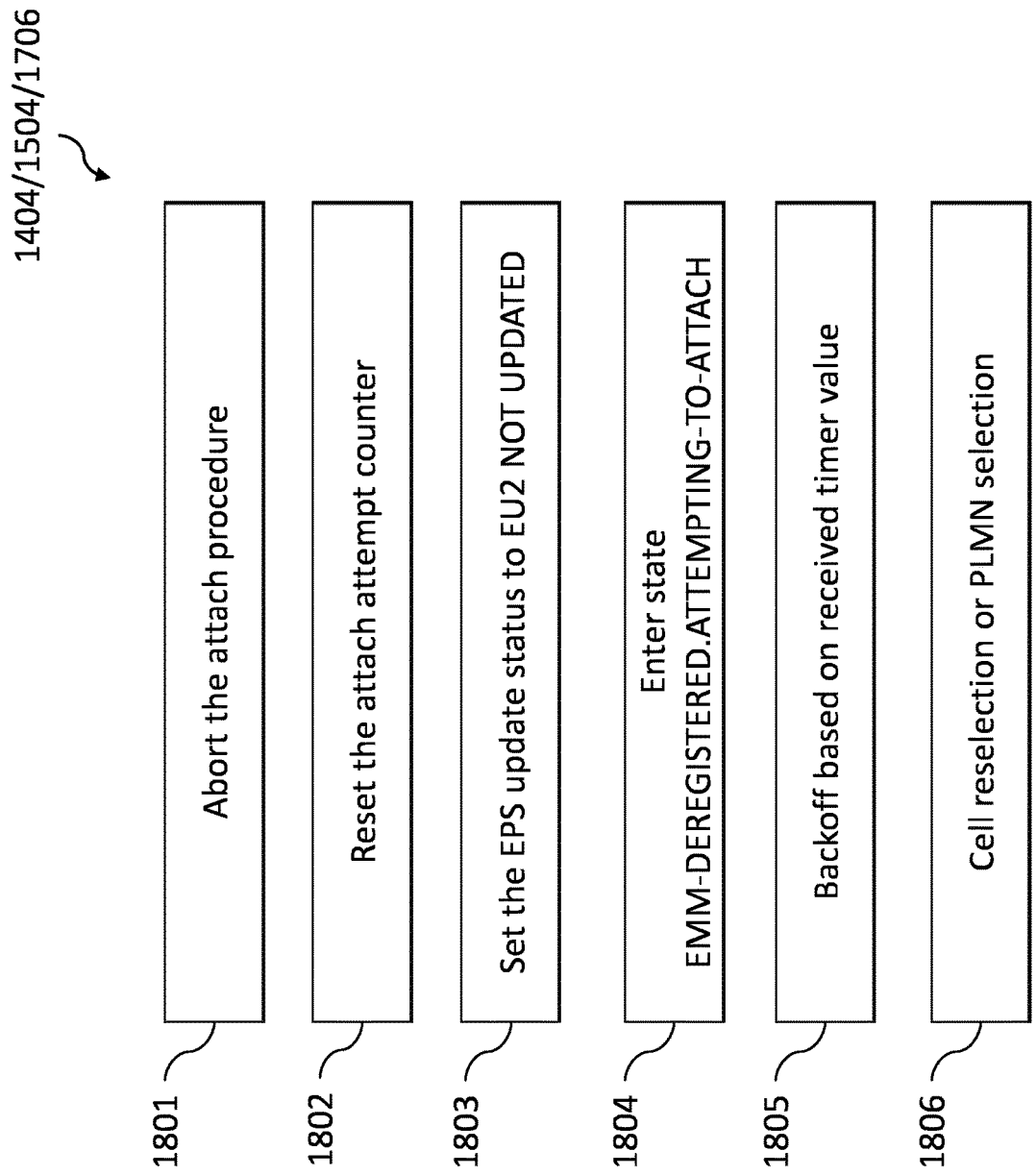
FIG. 18 illustrates a security management procedure in a 4G network for UE handling following an unsuccessful initial attach or mobility tracking area update according to one or more illustrative embodiments.

FIG. 18 illustrates a security management procedure in a 4G EPC network for UE handling following an unsuccessful initial attach (e.g., step 1404 in message flow 1400 or step 1504 in message flow 1500) or mobility tracking area update (e.g., step 1706 in message flow 1700). In step 1801, the UE 102 aborts the attach procedure (which is an initial attach procedure in message flows 1400 and 1500, and a mobility or TAU procedure in message flow 1700). The UE 102 resets the attach attempt counter in step 1802, and sets the EPS update status to "EU2 NOT UPDATED" in step 1803. The UE 102 then enters the state "EMM-DEREGISTERED.AT-TEMPTING-TO-ATTACH" in step 1804. The UE 102 performs backoff based at least in part on the received timer value (e.g., from the attach reject message in step 1403, 1503 or 1705). The UE 102 performs cell reselection or PLMN selection in step 1806.

The particular processing operations and other system functionality described in conjunction with the message flow diagrams of FIGS. 6A-11 and 13A-18 are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, network node configurations, messaging protocols and message formats than those described above in the context of the illustrative embodiments. These and numerous other alternative embodiments within the scope of the appended claims will be readily apparent to those skilled in the art.

What is claimed is:

1. An apparatus comprising:
  at least one processor;
  at least one memory including computer program code;
  the at least one memory and the computer program code being configured to, with the at least one processor, cause the apparatus at least to:
    receive, from user equipment, a request indicating one or more security capabilities of the user equipment;
    determine whether the indicated one or more security capabilities meet one or more designated criteria of a communication network;
    reject the request by the user equipment responsive to determining that the indicated one or more security capabilities do not meet the one or more designated criteria of the communication network; and
    send a rejection notification to the user equipment, the rejection notification comprising a failure cause indication based at least in part on the determination that the indicated one or more security capabilities do not meet the one or more designated criteria of the communication network;
  wherein the failure cause indication comprises a cause code indicating to the user equipment that an initial access request or a mobility request has failed due to the one or more security capabilities of the user equipment not being acceptable to the communication network.

2. The apparatus of claim 1, wherein the rejection notification further comprises a back-off timer value.

3. The apparatus of claim 1, wherein the initial access request comprises an initial registration request or an initial attach request and the mobility request comprises a mobility registration request or a mobility tracking area update request.

4. The apparatus of claim 1, wherein the indicated one or more security capabilities comprise an indication of one or more encryption algorithms supported by the user equipment, and further wherein the determination that the indicated one or more security capabilities do not meet the one or more designated criteria of the communication network comprises determining that the user equipment (i) does not support any encryption algorithm or (ii) fails to support a mandatory encryption algorithm.

5. The apparatus of claim 1, wherein the indicated one or more security capabilities comprise an indication of one or more integrity algorithms supported by the user equipment, and further wherein the determination that the indicated one or more security capabilities do not meet the one or more designated criteria of the communication network comprises determining that the user equipment (i) does not support any integrity algorithm or (ii) fails to support a mandatory integrity algorithm.

6. The apparatus of claim 1, wherein the communication network comprises a 5G network and the apparatus comprises an access and mobility management function (AMF) of the 5G network.

7. The apparatus of claim 1, wherein the communication network comprises a 4G network and the apparatus comprises mobility management entity (MME) of the 4G network.

8. The apparatus of claim 1, wherein the failure cause indication comprises a 5G System (5GS) mobility management (5GMM) cause value.

9. The apparatus of claim 1, wherein the failure cause indication comprises an Evolved Packet System (EPS) mobility management (EMM) cause value.

10. The apparatus of claim 1, wherein the failure cause indication signals the user equipment to (i) abort a registration procedure with the communication network and (ii) reset a registration attempt counter.

11. A method comprising:
  receiving, from user equipment, a request indicating one or more security capabilities of the user equipment;
  determining whether the indicated one or more security capabilities meet one or more designated criteria of a communication network;
  rejecting the request by the user equipment responsive to determining that the indicated one or more security capabilities do not meet the one or more designated criteria of the communication network; and
  sending a rejection notification to the user equipment, the rejection notification comprising a failure cause indication based at least in part on the determination that the indicated one or more security capabilities do not meet the one or more designated criteria of the communication network;

wherein the failure cause indication comprises a cause code indicating to the user equipment that an initial access request or a mobility request has failed due to the one or more security capabilities of the user equipment not being acceptable to the communication network.

12. An article of manufacture comprising a non-transitory computer-readable storage medium having embodied therein executable program code that when executed by a processor causes the processor to perform the steps of claim 11.

13. An apparatus comprising:
at least one processor;
at least one memory including computer program code;
the at least one memory and the computer program code being configured to, with the at least one processor, cause the apparatus at least to:
send, to a security management node in a communication network, a request indicating one or more security capabilities of the apparatus; and
receive, from the security management node, a rejection notification responsive to the indicated one or more security capabilities not meeting one or more designated criteria of the communication network;
wherein the rejection notification comprises a failure cause indication based at least in part on a determination that the indicated one or more security capabilities do not meet the one or more designated criteria of the communication network; and
wherein the failure cause indication comprises a cause code indicating to the apparatus that an initial access request or a mobility request has failed due to the one or more security capabilities of the apparatus not being acceptable to the communication network.

14. The apparatus of claim 13, wherein the initial access request comprises an initial registration request or an initial attach request and the mobility request comprises a mobility registration request or a mobility tracking area update request.

15. The apparatus of claim 13, the indicated one or more security capabilities comprise an indication of one or more encryption algorithms supported by the apparatus, and further wherein the rejection notification is received responsive to a determination that the apparatus (i) does not support any encryption algorithm or (ii) fails to support a mandatory encryption algorithm.

16. The apparatus of claim 13, the indicated one or more security capabilities comprise an indication of one or more integrity algorithms supported by the apparatus, and further wherein the rejection notification is received responsive to a determination that the apparatus (i) does not support any integrity algorithm or (ii) fails to support a mandatory integrity algorithm.

17. The apparatus of claim 13, wherein in response to receiving the rejection notification the at least one memory and the computer program code are further configured to, with the at least one processor, cause the apparatus to:
abort an attempt to access the communication network; and
reset an access attempt counter.

18. The apparatus of claim 13, wherein in response to receiving the rejection notification the at least one memory and the computer program code are further configured to, with the at least one processor, cause the apparatus to refrain from attempting to access the communication network based at least in part on a timer value included in the rejection notification.

19. A method comprising:
sending, to a security management node in a communication network, a request indicating one or more security capabilities of an apparatus; and
receiving, from the security management node, a rejection notification responsive to the indicated one or more security capabilities not meeting one or more designated criteria of the communication network;
wherein the rejection notification comprises a failure cause indication based at least in part on a determination that the indicated one or more security capabilities do not meet the one or more designated criteria of the communication network; and
wherein the failure cause indication comprises a cause code indicating to the apparatus that an initial access request or a mobility request has failed due to the one or more security capabilities of the apparatus not being acceptable to the communication network.

20. An article of manufacture comprising a non-transitory computer-readable storage medium having embodied therein executable program code that when executed by a processor causes the processor to perform the steps of claim 19.

* * * * *